(12) United States Patent
Foust et al.

(10) Patent No.: US 8,612,035 B2
(45) Date of Patent: *Dec. 17, 2013

(54) AUDIO FILE EDITING SYSTEM AND METHOD

(75) Inventors: Matthew J. Foust, St. Paul, MN (US); Evan F. Olcott, Minneapolis, MN (US)

(73) Assignee: Audiofile Engineering, St. Paul, MN (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/987,608

(22) Filed: Jan. 10, 2011

(65) Prior Publication Data

US 2011/0166679 A1  Jul. 7, 2011

Related U.S. Application Data

(63) Continuation of application No. 11/507,786, filed on Aug. 21, 2006, now Pat. No. 7,869,892.

(60) Provisional application No. 60/709,965, filed on Aug. 19, 2005.

(51) Int. Cl.
*G06F 17/00* (2006.01)

(52) U.S. Cl.
USPC ........................................................... 700/94

(58) Field of Classification Search
USPC .................... 700/94; 715/723, 202, 204, 823;
345/328, 302; 381/56, 61
See application file for complete search history.

(56) References Cited

U.S. PATENT DOCUMENTS

| | | | |
|---|---|---|---|
| 4,597,318 A | 7/1986 | Nikaido et al. |
| 5,331,111 A | 7/1994 | O'Connell |
| 5,781,188 A | 7/1998 | Amiot et al. |
| 6,410,837 B2 | 6/2002 | Tsutsumi |
| 6,490,359 B1 | 12/2002 | Gibson |
| 6,757,573 B1 | 6/2004 | Ledoux et al. |
| 6,888,999 B2 | 5/2005 | Herberger et al. |
| 7,869,892 B2 | 1/2011 | Foust et al. |
| 2004/0220814 A1 | 11/2004 | Rudolph |
| 2004/0264715 A1 | 12/2004 | Lu et al. |

OTHER PUBLICATIONS

File History for U.S. Appl. No. 11/507,786, filed Aug. 21, 2006, Now Issued U.S. Patent No. 7,869,892.

*Primary Examiner* — Andrew C Flanders
(74) *Attorney, Agent, or Firm* — Patterson Thuente Pedersen, P.A.

(57) ABSTRACT

An audio file editing system enabling creation and editing of audio content within a single multi-layer audio file. The audio editor and method of the invention enables "layering" of audio content relative to other audio content within a single file to create a multi-layered audio file. This enables audio information to be combined in a way that keeps all content active and editable until the final product. An unlimited number of layers can be assembled within a file, constrained only by practical file size limits and system capabilities.

18 Claims, 28 Drawing Sheets

X:0.73    Y:-2.6 dB    S:0.75    E:0.84    L:0.09
FIG. 10F
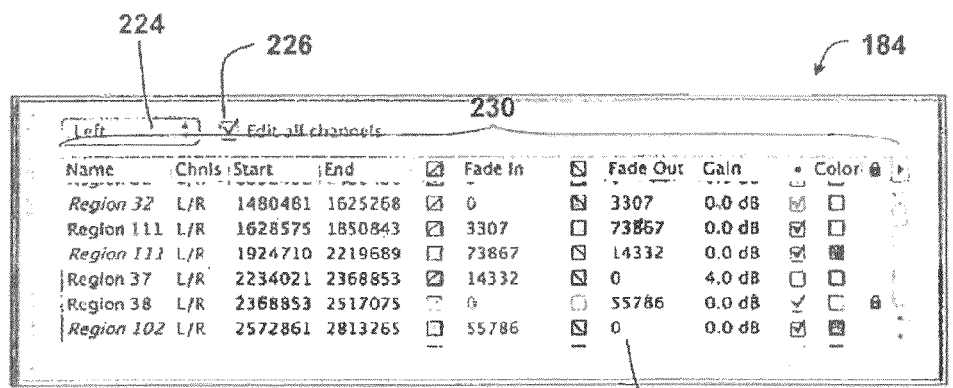
FIG. 10G
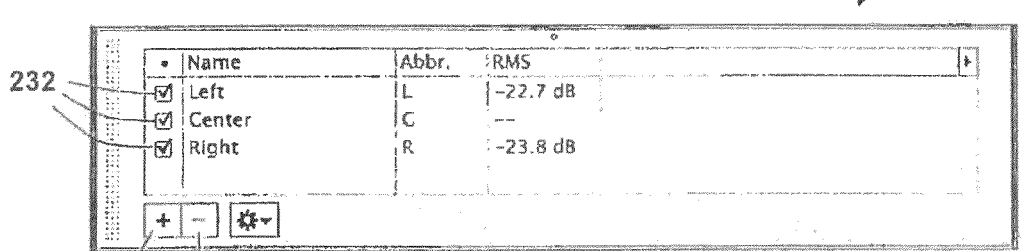
FIG. 10H

AUDIO FILE EDITING SYSTEM AND METHOD

RELATED APPLICATIONS

This application is a continuation of U.S. patent application Ser. No. 11/507,786, filed Aug. 21, 2006, which application claims the benefit of U.S. Provisional Patent Application No. 60/709,965, entitled AUDIO FILE EDITING SYSTEM AND METHOD, filed Aug. 19, 2005, all of which are hereby fully incorporated herein by reference.

COMPUTER PROGRAM LISTING APPENDIX

A computer program listing was included in Compact Disk format as Appendix A to the parent application, U.S. patent application Ser. No. 11/507,786, the computer program listing consisting of one original disk and one duplicate. Each disk includes the following files:

AFClippedFormatter.m
AFCombine TypeFormatter.h
AFCombine TypeFormatter.m
AFCreatorFormatter.h
AFCreatorFormatter.m
AFDataFormatter.h
AFDataFormatter.m
AFDecibelFormatter.h
AFDecibelFormatter.m
AFDetuneFormatter.h
AFDetuneFormatter.m
AFDifferenceFormatter.h
AFDifferenceFormatter.m
AFFileNameFormatter.h
AFFileNameFormatter.m
AFFileSizeFormatter.h
AFFileSizeFormatter.m
AFFormatFormatter.h
AFFormatFormatter.m
AFFrequencyFormatter.h
AFFrequencyFormatter.m
AFGainFormatter.h
AFGainFormatter.m
AFKeyFormatter.h
AFKeyFormatter.m
AFLocalizedString.h
AFLoopFormatter.h
AFLoopFormatter.m
AFLoop TypeFormatter.h
AFLoop TypeFormatter.m
AFMIDINoteFormatter.h
AFMIDINoteFormatter.m
AFPercentFormatter.h
AFPercentFormatter.m
AFPlaybackTypeFormatter.h
AFPlaybackTypeFormatter.m
AFProgressIndicator.h
AFProgressIndicator.m
AFRangeFormatter.h
AFRangeFormatter.m
AFSampleRateFormatter.h
AFSampleRateFormatter.m
AFSamplesFormatter.h
AFSamplesFormatter.m
AFTimeRemainingFormatter.m
AFTimeSignatureFormatter.h
AFTimeSignatureFormatter.m
AFWaveView.h
AFWaveView.m
Info.plist main.m
NSImage (AFExtension).h
NSImage (AFExtension).m
NSIndexset (AFExtension).h
NSIndexSet (AFExtension).m
NSMatrix (AFExtension).h
NSMatrix (AFExtension).m
NSMenu (AFExtension).h
NSMenu (AFExtension).m
NSOutlineView (AFExtension).h
NSOutlineView (AFExtension).m
NSPopUpButton (AFExtension).h
NSPopUpButton (AFExtension).m
NSSegmentedControl (AFExtension).h
NSSegmentedControl (AFExtension).m
shortcuts.xml
AFAudioBuffer.m.svn-base
AFAudioBuffer.h.svn-base
AFAudioFileWrapper.h.svn-base
AFAudioFileWrapper.m.svn-base
AFAudioFileWrapper_Access.h.svn-base
AFAudioFileWrapper_Access.m.svn-base
AFAudioFileWrapper_Analysis.h.svn-base
AFAudioFileWrapper_Analysis.m.svn-base
AFAudioFileWrapper_Chunks.h.svn-base
AFAudioFileWrapper_Chunks.m.svn-base
AFAudioFileWrapper_Editing.h.svn-base
AFAudioFileWrapper_Editing.m.svn-base
AFAudioFileWrapper_Parse.h.svn-base
AFAudioFileWrapper_Parse.m.svn-base
AFAudioFileWrapper_Process.h.svn-base
AFAudioFileWrapper_Process.mm.svn-base
AFAudioFileWrapper_Process.mm.svn-base
AFAudioFileWrapper_ReadWrite.h.svn-base
AFAudioFileWrapper_ReadWrite.m.svn-base
REX.c.svn-base
REX.h.svn-base
AFAudioFileWriter.h.svn-base
AFAudioFileWriter.m.svn-base
AFAudioFileWriter_Access.h.svn-base
AFAudioFileWriter_Access.h.svn-base
AFAudioFileWriter_Headers.h.svn-base
AFAudioFileWriter_Headers.m.svn-base
AFAudioUnitEditor.h.svn-base
AFAudioUnitEditor.m.svn-base
classes.nib.svn-base
info.nib.svn-base
objects.xib.svn-base
AFAudioUnitEntry.h.svn-base
AFAudioUnitEntry.m.svn-base
AFAutomationEntry.h.svn-base
AFAutomationEntry.m.svn-base
5__1.abbr.svn-base
6__1.abbr.svn-base
7__1.abbr.svn-base
10__2.abbr.svn-base
lcrs.abbr.svn-base
mono.abbr.svn-base
quad.abbr.svn-base
stereo.abbr.svn-base
5__1.name.svn-base
6__1.name.svn-base
7__1.name.svn-base
10__2.name.svn-base
lcrs.name.svn-base
mono.name.svn-base quad.name.svn-base
stereo.name.svn-base
AFChannelsList.h.svn-base
AFChannelsList.m.svn-base
AFChunk.h.svn-base
AFChunk.m.svn-base
AFCogPopUpButton.h.svn-base
AFCogPopUpButton.m.svn-base
cog.tiff.svn-base
cog_pressed.tiff.svn-base
AFColorCell.h.svn-base
AFColorCell.m.svn-base
AFEditBlock.h.svn-base
AFEditBlock.m.svn-base
AFEditList.h.svn-base
AFEditList.m.svn-base
AFEditList_Access.h.svn-base
AFEditList_Access.m.svn-base
AFEditList_Editing.h.svn-base
AFEditList_Editing.m.svn-base
AFIconTextCell.h.svn-base
AFIconTextCell.m.svn-base
AFIndex.h.svn-base
AFIndex.m.svn-base
AFIndexList.h.svn-base
AFIndexList.m.svn-base
AFLabel.h.svn-base
AFLabel.m.svn-base
AFLabelList.h.svn-base
AFLabelList.m.svn-base
AFLabels.h.svn-base
AFLoop.h.svn-base
AFLoop.m.svn-base
AFLoopList.h.svn-base
AFLoopList.m.svn-base
AFMarker.h.svn-base
AFMarker.m.svn-base
AFMarkerList.h.svn-base
AFMarkerList.m.svn-base
AFRangeLabel.h.svn-base
AFRangeLabel.m.svn-base
AFRegion.h.svn-base
AFRegion.m.svn-base
AFRegionList.h.svn-base
AFRegionList.m.svn-base
AFSlice.h.svn-base
AFSlice.m.svn-base
AFSliceList.h.svn-base
AFSliceList.m.svn-base
AFTrack.h.svn-base
AFTrack.m.svn-base
AFTrackList.h.svn-base
AFTrackList.m.svn-base
AFLayer.h.svn-base
AFLayer.m.svn-base
AFMetadata.h.svn-base
AFMetadata.m.svn-base
metadata.xml.svn-base
AFTableCornerView.h.svn-base
AFTableCornerView.m.svn-base
corner_regular.tiff.svn-base
corner_small.tiff.svn-base
AFWaveformCache.h.svn-base
AFWaveformCache.m.svn-base
WEChannelListTableView.h.svn-base
WEChannelListTableView.m.svn-base
WEEditListTableView.h.svn-base
WEEditListTableView.m.svn-base
WELabelTableView.h.svn-base
WELabelTableView.m.svn-base
WELayerTableView.h.svn-base
WELayerTableView.m.svn-base
WELockCell.h.svn-base
WELockCell.m.svn-base
WELoopPlaybackCell.h.svn-base
WELoopPlaybackCell.m.svn-base
WEStrengthSlider.h.svn-base
WEStrengthSlider.m.svn-base
WEAnalyzer.h.svn-base
WEAnalyzer.m.svn-base
WEApplication.h.svn-base
WEApplication.m.svn-base
WEApplicationDelegate.h.svn-base
WEApplicationDelegate.m.svn-base
WEBarView.h.svn-base
WEBarView.m.svn-base
WEChannelsBarView.h.svn-base
WEChannelsBarView.m.svn-base
WEEditListBarView.h.svn-base
WEEditListBarView.m.svn-base
WEEditListBarView_Table.h.svn-base
WEEditListBarView_Table.m.svn-base
WEInfoBarText.h.svn-base
WEInfoBarText.m.svn-base
WEInfoBarView.h.svn-base
WEInfoBarView.m.svn-base
WELocationBarView.h.svn-base
WELocationBarView.m.svn-base
WEOverviewBarView.h.svn-base
WEOverviewBarView.m.svn-base
WEPlaybackBarView.h.svn-base
WEPlaybackBarView.m.svn-base
WEControlMenuWindow.h.svn-base
WEControlMenuWindow.m.svn-base
WERepeatButton.h.svn-base
WERepeatButton.m.svn-base
WERollButton.h.svn-base
WERollButton.m.svn-base
WEVarispeedButton.h.svn-base
WEVarispeedButton.m.svn-base
WEVolumeButton.h.svn-base
WEVolumeButton.m.svn-base
WEWaveformBarView.h.svn-base
WEWaveformBarView.m.svn-base
WEWaveformBarView_Mouse.h.svn-base
WEWaveformBarView_Mouse.m.svn-base
WEDocument.h.svn-base
WEDocument.m.svn-base
WEDocument_Graph.h.svn-base
WEDocument_Graph.m.svn-base
WEDocumentController.h.svn-base
WEDocumentController.m.svn-base
WEDragInfo.h.svn-base
WEDragInfo.m.svn-base
Fast Fade In.fade.svn-base
Fast Fade Out.fade.svn-base
Fast S Fade In.fade.svn-base
Fast S Fade Out.fade.svn-base
Linear Fade In.fade.svn-base
Linear Fade Out.fade.svn-base
Slow Fade In.fade.svn-base
Slow Fade Out.fade.svn-base
Slow S Fade In.fade.svn-base
Slow S Fade Out.fade.svn-base Slow S Fade Out.fade.svn-base
Fast Fade Out.fade.svn-base
Linear Fade In.fade.svn-base
Linear Fade Out.fade.svn-base
Slow Fade In.fade.svn-base
Slow Fade Out.fade.svn-base
Fade In.fade.svn-base
Fade Out.fade.svn-base
WEGenerator.h.svn-base
WEGenerator.m.svn-base
WEInspector.h.svn-base
WEInspector.m.svn-base
WEInspectorMetadataTableView.h.svn-base
WEInspectorMetadataTableView.m.svn-base
WELabelsDrawerView.h.svn-base
WELabelsDrawerView.m.svn-base
WELabelWellView.h.svn-base
WELabelWellView.m.svn-base
label_well_loop.tiff.svn-base
label_well_marker.tiff.svn-base
label_well_region.tiff.svn-base
label_well_slice.tiff.svn-base
WELayerCogPopUpButton.h.svn-base
WELayerCogPopUpButton.m.svn-base
WELayersDrawerView.h.svn-base
WELayersDrawerView.m.svn-base
WELevelMeter.h.svn-base
WELevelMeter.m.svn-base
WELevelMeterView.h.svn-base
WELevelMeterView.m.svn-base
bargradient_horiz.tiff.svn-base
barorange_horiz.tiff.svn-base
barsegmentlit_horiz.tiff.svn-base
barsegmentunlit_horiz.tiff.svn-base
meterpit_horiz.tiff.svn-base
overlit.tiff.svn-base
overunlit.tiff.svn-base
peak_horiz.tiff.svn-base
peak_vert.tiff.svn-base
scale_horiz.tiff.svn-base
scale_vert.tiff.svn-base
scalebbc_horiz.tiff.svn-base
scaledin_horiz.tiff.svn-base
scaleebu_horiz.tiff.svn-base
scalenordic_horiz.tiff.svn-base
scalevu_horiz.tiff.svn-base
WESpectrograph.h.svn-base
WESpectrograph.m.svn-base
WESpectrographView.h.svn-base
WESpectrographView.m.svn-base
WEStereograph.h.svn-base
WEStereograph.m.svn-base
WEStereographView.h.svn-base
WEStereographView.m.svn-base
WEOverviewView.h.svn-base
WEOverviewView.m.svn-base
WEPreferences.h.svn-base
WEPreferences.m.svn-base
WEProperties.h.svn-base
WEProperties.m.svn-base
WERecorder.h.svn-base
WERecorder.m.svn-base
WERecorderDeviceSignalView.h.svn-base
WERecorderDeviceSignalView.m.svn-base
WERecorderMeterView.h.svn-base
WERecorderMeterView.m.svn-base
WERecorderView.h.svn-base
WERecorderView.m.svn-base
WELocationTipView.h.svn-base
WELocationTipView.m.svn-base
WEWaveformView.h.svn-base
WEWaveformView.m.svn-base
WEWaveformView_Access.h.svn-base
WEWaveformView_Access.m.svn-base
WEWaveformView_Draw.h.svn-base
WEWaveformView_Draw.m.svn-base
WEWaveformView_Menu.h.svn-base
WEWaveformViewMenu.m.svn-base
WEWaveformView_Mouse.h.svn-base
WEWaveformView_Mouse.m.svn-base
WEWaveformView_Mouse_EditBlock.h.svn-base
WEWaveformView_Mouse_EditBlock.m.svn-base
WEWaveformView_Mouse_Fade.h.svn-base
WEWaveformView_Mouse_Fade.m.svn-base
WEWaveformView_Mouse_Waveform.h.svn-base
WEWaveformView_Mouse_Waveform.m.svn-base
WEWaveformView_Selection.h.svn-base
WEWaveformView_Selection.m.svn-base
WEWaveformView_Undo.h.svn-base
WEWaveformView_Undo.m.svn-base
WEWindowController.h.svn-base
WEWindowController.m.svn-base
WEWindowController_Editing.h.svn-base
WEWindowController_Editing.m.svn-base
WEWindowController_Export.h.svn-base
WEWindowController_Export.m.svn-base
WEWindowController_Labels.h.svn-base
WEWindowController_Labels.m.svn-base
WEWindowController_Layers.h.svn-base
WEWindowController_Layers.m.svn-base
WEWindowController_Menu.h.svn-base
WEWindowController_Menu.m.svn-base
WEWindowController_Metadata.h.svn-base
WEWindowController_Metadata.m.svn-base
WEWindowController_Process.h.svn-base
WEWindowController_Process.m.svn-base
WEProcessor.h.svn-base
WEProcessor.m.svn-base
WEProcessorAudioUnitsView.h.svn-base
WEProcessorAudioUnitsView.m.svn-base
WEProcessorChangeGainView.h.svn-base
WEProcessorChangeGainView.m.svn-base
WEProcessorConvertChannelsView.h.svn-base
WEProcessorConvertChannelsView.m.svn-base
WEProcessorConvertSampleRateView.h.svn-base
WEProcessorConvertSampleRateView.m.svn-base
WEProcessorDitherView.h.svn-base
WEProcessorDitherView.m.svn-base
WEProcessorInvertPhaseView.h.svn-base
WEProcessorInvertPhaseView.m.svn-base
WEProcessorMSDecoderView.h.svn-base
WEProcessorMSDecoderView.m.svn-base
WEProcessorNormalizeView.h.svn-base
WEProcessorNormalizeView.m.svn-base
WEProcessorPitchView.h.svn-base
WEProcessorPitchView.m.svn-base
WEProcessorRemoveDCView.h.svn-base
WEProcessorRemoveDCView.m.svn-base
WEProcessorReverseView.h.svn-base
WEProcessorReverseView.m.svn-base
WEProcessorSpeedView.h.svn-base
WEProcessorSpeedView.m.svn-base
WEProcessorSwapView.h.svn-base
WEProcessorSwapView.m.svn-base WEProcessorThresholdsView.h.svn-base
WEProcessorThresholdsView.m.svn-base
WEProcessorTrimView.h.svn-base
WEProcessorTrimView.m.svn-base
WEProcessorView.h.svn-base
WEProcessorView.m.svn-base
WEThresholdSlider.h.svn-base
WEThresholdSlider.m.svn-base The entire contents of the Compact Disk included with parent U.S. patent application Ser. No. 11/507,786 as Appendix A, including without limitation, the aforementioned files, is hereby incorporated herein by reference.

FIELD OF THE INVENTION

The invention relates generally to digital signal and data processing and more particularly to digital audio file editing and management in a computer system.

BACKGROUND OF THE INVENTION

The creation of digital audio files is known in the art. For example, a computer or other recording device can create or capture audio content and store the content in a digital file. The audio file may then later be edited, played back, saved, or transferred to another playback medium, among other tasks.

Audio files may be edited for content, length, timing, or effects; customized for a particular application; mixed, combined, or merged with other audio and/or visual content; or otherwise manipulated. Editing can therefore be a relatively simple or a more complex task, depending on the purpose for which it is performed.

A variety of audio composition and editing tools and techniques are currently known, many of which also include or accompany video editing tools and techniques. U.S. Pat. No. 4,597,318, for example, discloses a wave generating method and apparatus. U.S. Pat. No. 5,331,111 teaches a sound model generator and synthesizer with graphical programming engine. U.S. Pat. No. 6,410,837 teaches a remix apparatus and method, slice apparatus and method, and storage medium, and U.S. Pat. No. 6,888,999 teaches a method of remixing digital information. U.S. Pat. No. 6,490,359 discloses a method and apparatus for using visual images to mix sound. U.S. Pat. No. 6,757,573 teaches a method and system for authoring a soundscape for a media application. U.S. Patent Application Publication No. 2004/0220814 teaches methods and systems for mixing audio signals, and U.S. Patent Application Publication No. 2004/0264715 teaches a method and apparatus for playback of audio files. The above-identified patents and published applications are incorporated herein by reference.

Many of these and other audio editing tools, however, are complex and considerably expensive, limiting their appropriateness or attractiveness for use by a casual or amateur audio editor. Reducing complexity, on the other hand, can result in a less robust editing tool that does not include the features necessary for high-end and professional users. In either case, audio editing tools frequently operate within a program-specific interface, which can take significant time to learn, navigate, and master at a level sufficient to make audio editing tasks efficient and user-friendly. Further, the approaches taken and techniques implemented by existing audio tools frequently do not provide a user with specific and fine control over isolated portions of audio content while maintaining global audio content editing access.

There is, therefore, a need for an audio file editing tool, system, and method of using the same that substantially address the aforementioned shortcomings.

SUMMARY OF THE INVENTION

The invention disclosed herein resolves many of the aforementioned deficiencies and drawbacks inherent to audio editing processes currently known in the art. In particular, various embodiments of the present invention are directed to systems and methods for managing and editing multi-layered audio file content.

The above summary of the invention is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 10F is a screen-shot depiction of the Location bar of a GUI according to an embodiment of the invention;

FIG. 10G is a screen-shot depiction of the Edit List bar of a GUI according to an embodiment of the invention;

FIG. 10H is a screen-shot depiction of the Channels bar of a GUI according to an embodiment of the invention;

FIG. 17A is a screen-shot depiction of a cubic fade curve;

FIG. 18B is a screen-shot depiction of a spectrograph of a GUI according to an embodiment of the invention.

Figure 1:
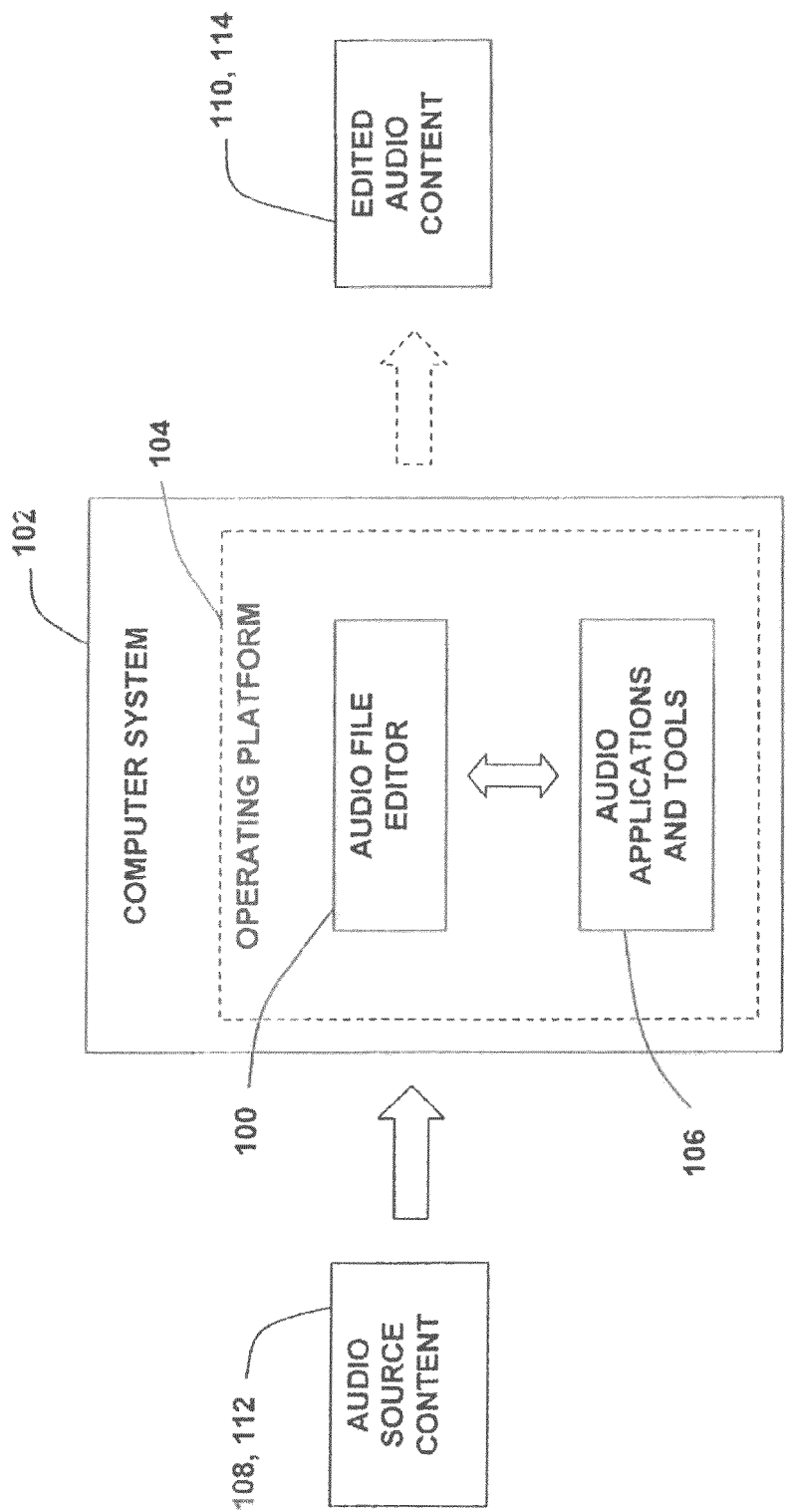
FIG. 1 is a block diagram of a computer system according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The audio file editing system and method of the invention disclosed herein enable efficient and intuitive editing of audio content in multi-layered files. The invention can be more readily understood by reference to FIGS. 1-18C, the source code listing on the compact disc of Appendix A to this application, hereby fully incorporated herein by reference, and the following description. While the invention is specifically not limited to the specific examples described herein, the invention will be better appreciated using a discussion of the following exemplary embodiments in specific contexts.

Referring to FIG. 1, the audio file editing system of the invention generally includes a document-based audio file editor 100 that operates on a computer system 102 in communication with a computer operating system or platform 104. One preferred embodiment of the system is customized to operate on a MACINTOSH® platform, for example MAC® OS X and predecessors, successors, and similar operating systems, although the system can be further customized or updated to operate on other computer platforms and operating systems in other embodiments. One advantage presented by customization for MACINTOSH® platforms is a significant market share held by MACINTOSH® within applicable audio and related industries and sectors. As is understood by those skilled in the art, however, alternate versions or translators of the system can be created to provide wider applicability to other computer and operating systems.

In one embodiment, the audio file editing system can be developed on and customized within an object-oriented application environment. In one embodiment, the object-oriented application environment COCOA®, designed for developing MAC® OS X native applications, is used to write one embodiment of the audio file editor of the invention that is customized for a MAC® OS X operating platform. COCOA®, in this environment, provides for streamlined performance of audio file editor 100 on the operating platform and minimizes or eliminates incorporation of outdated, obsolete, or incompatible technologies while providing a versatile, efficient, and robust creation environment. In MACINTOSH® embodiments, the audio file editor can use the AQUA® graphical user interface elements. The native AQUA® graphical user interface provides an elegant, efficient, and intuitive base for immediate familiarity to audio file editors familiar with MACINTOSH® operating systems and speeds learning as compared to customized graphical user interfaces (GUI) used by other audio editors. In other embodiments, customized user interfaces can be created as needed or desired. Further, the audio file editor can be extended or versioned in other programming platforms for MACINTOSH® or other operating systems and platforms in other embodiments of the invention.

Audio editor 100, via computer system 102 and operating system 104, preferably receives or imports existing audio content 112 in one embodiment, rather than directly capturing or recording content from a microphone, instrument, or other source. Accordingly, the system can interface with other audio tools and the host computer platform and operating system to obtain the content for editing within the host computer platform. The system can input audio files such as ones supported by the host computer platform's audio program, including existing AIFF, WAV, Sound Designer I and II, ReCycle, μLaw, or other audio file formats known to those skilled in the art, or importing MP3, MP4, ACC, and other similar audio files.

Audio tools 106 (FIG. 1) may also generally include basic audio output tools, such as drivers, speakers, and other hardware and software, for example a read/write compact disc (CD) or digital versatile disc (DVD) drive, for playback and saving of audio source content 40 and edited audio content 60. In one embodiment in which audio file editor 100 is operating on a Macintosh® computer system, editor 100 is configured to interface with a Macintosh® audio program, such as Core Audio, to playback audio content.

In an embodiment, the opened or imported audio files are subsequently converted into a document format native to the file editor 100. In various embodiments, audio file editor 100 includes its own recorder utility. The computer system 102 and operating system 104 comprise audio tools 106, such as a microphone, audio interface, and other hardware and associated software, to provide direct creation or recording of audio content. The content can then be saved as an audio file for subsequent access by audio editor 100 in one embodiment, or input directly to audio editor 100 in another embodiment.

In an embodiment, the audio file editing system of the invention enables creation and editing of audio content within a single multi-layer audio file. Audio editor 100 enables "layering" of audio content relative to other audio content within a single file to create a multi-layered audio file. This enables audio information to be combined in a way that keeps all content active and editable until the final product. In one embodiment, an unlimited number of layers can be assembled within a file, constrained only by practical file size limits and system capabilities.

Figure 2:
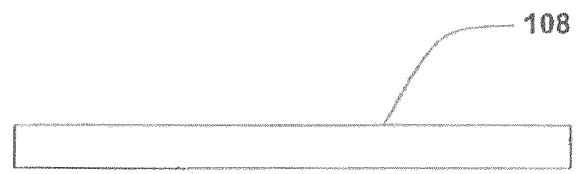
FIG. 2 is a schematic depiction of a layer according to an embodiment of the invention.

By way of a simplified example, FIG. 2 depicts a first audio layer 108. Layer 108 may be conceptualized as a virtual container for digital audio information that allows for editing of the audio information within that virtual container. Layer 108 may be of any format and have any sample rate and number of channels. A controllable set of inserted audio unit processors may be associated with layer 108 that permit editing and modification of the audio content of layer 108 in real time. Audio processes associated with layer 108 may include, but are not limited to, alterations to audio volume or level, matching the maximum or RMS audio level to a value set by the user, inverting the audio phase, altering the beginning or endpoint of a segment of audio, changing the speed or pitch of audio, and converting the sampling rate of audio. Accordingly, each layer 108 has its own properties, which can include a name, start time, order, and volume, and can also have a separate sample rate, range, and channel configuration. Each layer 108 may hold content to a distinct audio file, a selected portion of an audio file, or a previously edited audio file. In addition, each layer 108 may allow the addition of any number of audio units, plug-in effects usable by any audio program installed on the operating system 104.

Multiple layers 108 can be combined in a variety of ways known to those skilled in the art, such as adding, subtracting, or ducking multiple layer signals. In one embodiment, a primary layer serves as the basis on top of which additional layers can be combined. Thus, more complex audio files can be assembled, with more editing and content control provided by the accessibility of individual layers, while providing unitary playback and processing in proper real time. The audio file editing system of the invention also supports files of any channel count, within the specifications of the individual file formats, and any sample rate and depth. Additionally, the system supports split file formats, or groups of files that reference a single multi-channel audio file, wherein each channel is associated with a separate file and a given file name extension.

In one embodiment, audio file editor 100 can also provide global and/or multi-layer audio effects as previously described with respect to single layers. Thus, while in some situations a single particular audio layer will be edited to include an effect, others will apply global effects or changes to all layers. For example, a multi-layer file or set of select layers can be normalized as to a target output. This global or multi-layer editing feature further streamlines the audio editing process and related tasks.

Upon accessing an existing audio file, the audio characteristics of the file, or layer 108 of the file, can be viewed and edited within editor 100. Audio editor 100 enables viewing, via an intuitive GUI described in more detail below, and changing of the actual audio file content and nearly any file characteristic by providing a virtually unlimited number and variety of audio editing tools. These tools can include standard cut, copy, paste, and delete commands, as well as drag and drop commands, as described in more detail in the description and examples set forth below.

As in other audio and non-audio computer systems, some or all of the available editing commands are supported internal to a current audio document as well as between multiple audio files. For example, a portion of a first audio document can be selected, copied, and pasted into a second audio document, similar to selecting, copying, and pasting between word processing documents. The audio editing system thereby provides a familiar, user-friendly interface and operating scheme to users generally familiar with computers.

Other available audio editing tools and commands include audio processes and effects. These processes and effects include but are not limited to gain changing, trimming, fading, sample rate changing, sample range changing, channel format changing, processing, third-party audio unit processors, and the like. The system also supports label editing, which can include markers, slices (i.e, a playback beat edge), regions, and loops; MIDI information; tempo and time signature information, and file metadata information, among others. This will be described in more detail below.

In one embodiment, audio file editor 100 also provides graphical fade editing. Fades are automated modifiers in audio volume for a variable range of time. Fades are not "printed" as a process but rather are processed in real time, respective to a layer. Fades can also be added to, copied and pasted between layers or file documents.

Figures 17A, 17B, 17C:
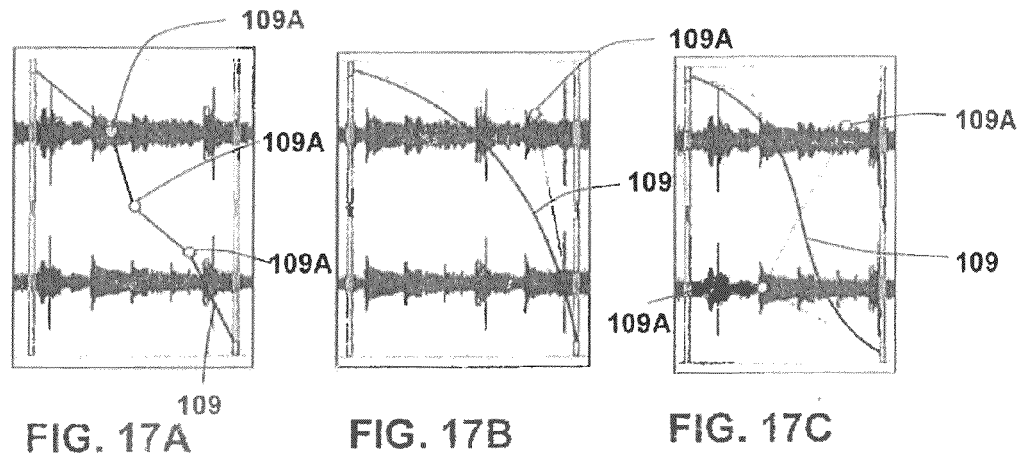
FIG. 17A is a screen-shot depiction of a segmented fade curve.
FIG. 17B is a screen-shot depiction of a quadratic fade curve.

In an embodiment as depicted in FIGS. 17A-C, fades are displayed graphically as curves 109 representing their underlying mathematical function. The graphical curves 109 may contain points or handles 109A that can be grabbed and dragged with the computer mouse to change the shape of the curve within a layer. In addition, multiple fades can be "snapped" together to form a smooth, multi-object fade. Fade curves may be segmented (FIG. 17A), quadratic (FIG. 17B), cubic (FIG. 17C), or any other mathematical curves suitable for modifying audio volume. As depicted in FIGS. 17A-C, a quadratic fade curve may have one handle corresponding to its single curvature, and a cubic fade curve may have two handles corresponding to its double curvature. In an embodiment, a fade provides superior sound by using a true cubic Bezier curve, as opposed to a quadratic curve or linear approximation, and can be shifted within a layer by grabbing on to its points or handles.

Figure 4:
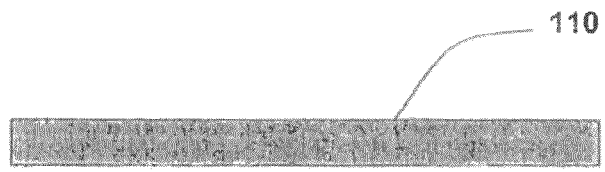
FIG. 4 is a schematic depiction of an edited version of the layer of FIG. 2.

Again referring to a simplified example, FIG. 4 depicts layer 108 after editing in the system of the invention as layer 110. After audio source content 112 was opened in audio editor 100 as original layer 108, layer 108 was edited to change content, one or more audio characteristics, and/or file attributes, resulting in edited layer 110 containing edited audio content 114.

Figure 5:
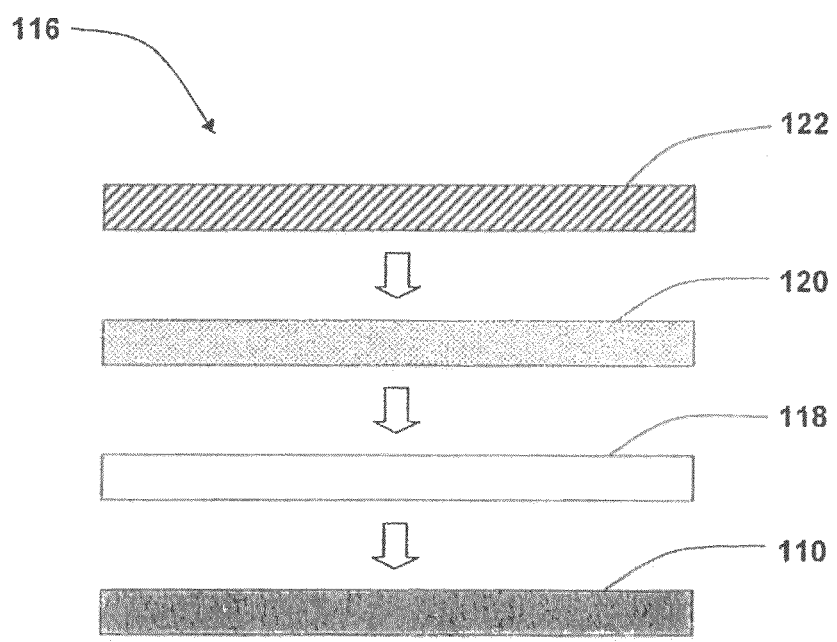
FIG. 5 is a schematic depiction of a multi-layer audio file according to an embodiment of the invention.

As depicted in FIG. 5, additional layers can be created, edited, and added to create a multi-layer audio file 116 having particular audio content and characteristics. Each layer can be individually customized and edited as previously described to create a unique audio file 116 as needed or desired. FIG. 5 depicts an embodiment including four individual audio layers 110, 118, 120, 122, each having been individually edited within audio editor 10 and resulting in a distinct audio profile. As is understood by those skilled in the art, multiple identical layers can be used to create an effect or can be tiered or staggered within file 116 to achieve a desired playback result. Although four layers are depicted in FIG. 5, it will be appreciated by those of skill in the art that virtually any number of separate layers may be included in a single audio file 116 according to embodiments of the present invention.

Figure 8:
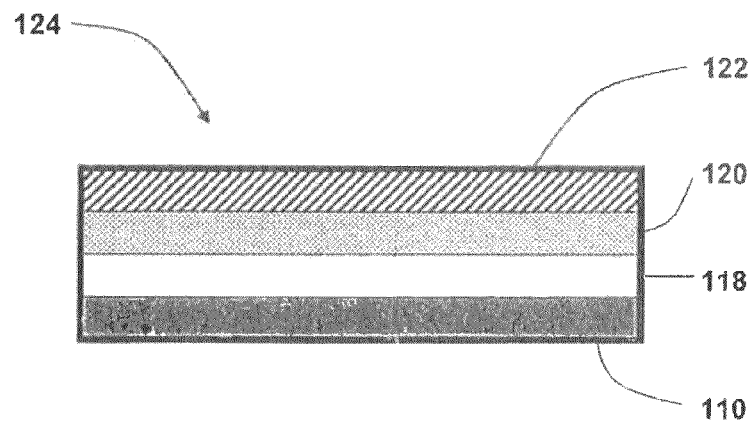
FIG. 8 is a schematic depiction of a flattened multi-layer audio file according to an embodiment of the invention.

According to embodiments of the invention, layers 110, 118, 120, 122 may be "flattened" by audio editor 100 into a single layer 124 as depicted in FIG. 8. A single layer can be flattened (FIG. 6) using a "Flatten Layer" command 126, or all layers can be flattened (FIG. 7) using a "Flatten All" command 128 to create the new single layer 124 depicted in FIG. 8 as the sum of layers 110, 118, 120, 122 and the associated audio processes of each separate layer. Flattening a single layer 110 involves combining all of the audio units, fades, and other additions on that layer to permanently apply those conditions. Flattening all layers 110, 118, 120, 122 involves combining all of the audio units, fades, and other additions for each of those layers, and further combining all the layers 110, 118, 120, 122 together to make a single flattened audio file 800. A flattened multi-layered file comprising "single" layer 124 can then be saved in computer system 102 as a common single-layered audio file format.

As depicted in FIG. 8, however, individual layers 110, 118, 120, 122 may still be distinguishable within layer (file) 124. Multi-layer audio files can be identified as a unique file format, based in one embodiment in XML, that is accessible to audio applications and tools 106. The multi-layer audio file format can be viewed as a "file wrapper," in that individual audio layers 110, 118, 120, 122 are saved and can be accessed individually within multi-layer file 124. The multi-layer file wrapper appears, to a user, to be a single file, while providing a transparent directory to the individual content layers.

Figure 6:
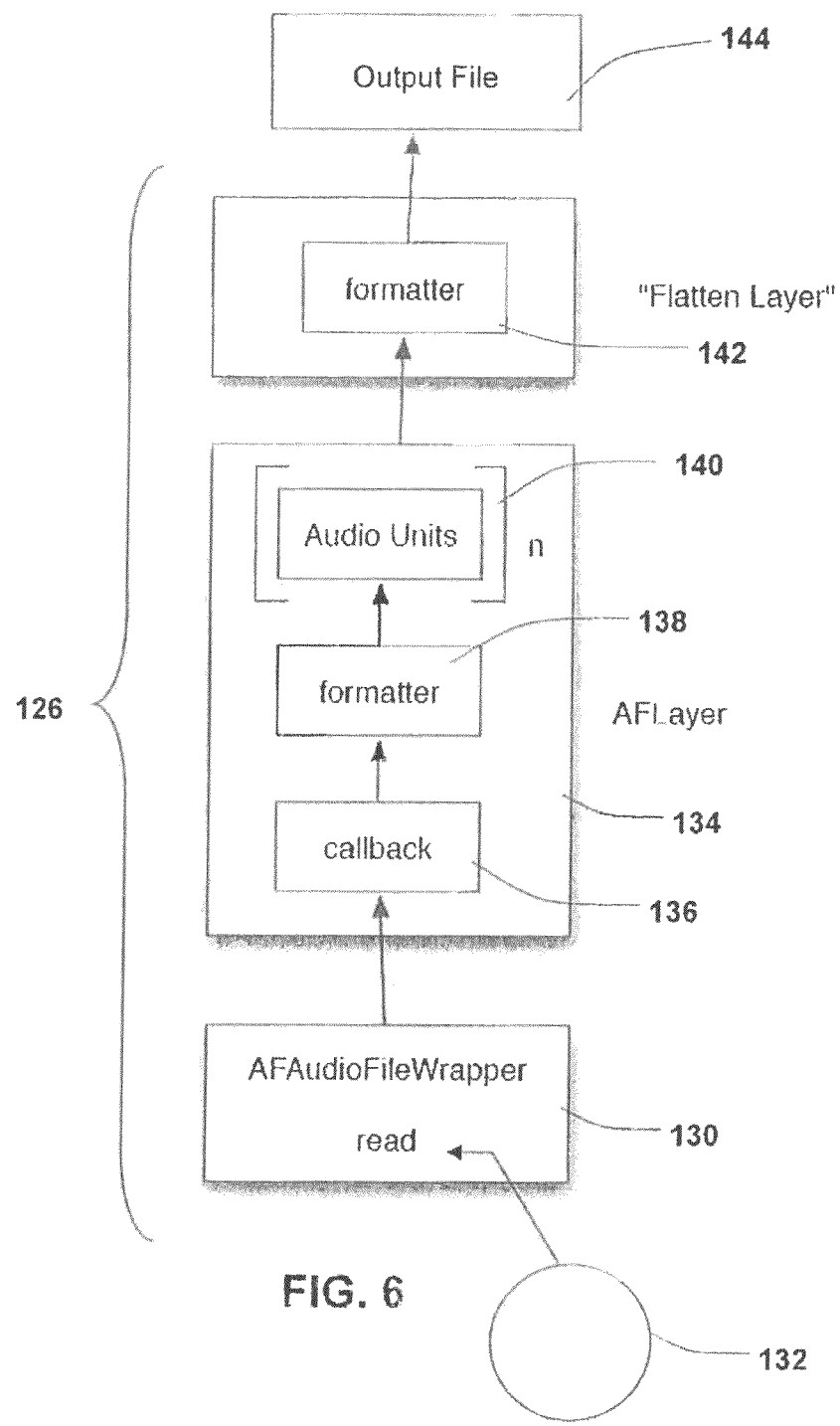
FIG. 6 is a schematic flowchart of a Flatten Layer function according to an embodiment of the invention.

Referring now to FIG. 6, the "Flatten Layer" command 126 generally includes a series of functions. AFAudioFileWrapper function 130 reads an audio file from disk 132 and stores it in a separate memory location. AFLayer 134 generally includes callback function 136, formatter function 138, and one or more audio units 140. Callback function 136 retrieves the audio file from the separate memory location where it was placed by AFAudioFileWrapper function 130. Formatter function 138 then formats the retrieved audio file into a more functional audio format that facilitates subsequent calculations. As previously mentioned, AFLayer 134 may also contain any number (the number of multiple units 140 being represented in the figures using the variable designation "n . . . ") of audio units 140 added by the user. The formatted audio is then passed through all audio units 140 applied by the user for that AFLayer 134. The processed audio is then passed to final formatter 142 to be formatted into a user selected file type and written into a final audio file 144.

Figure 7:
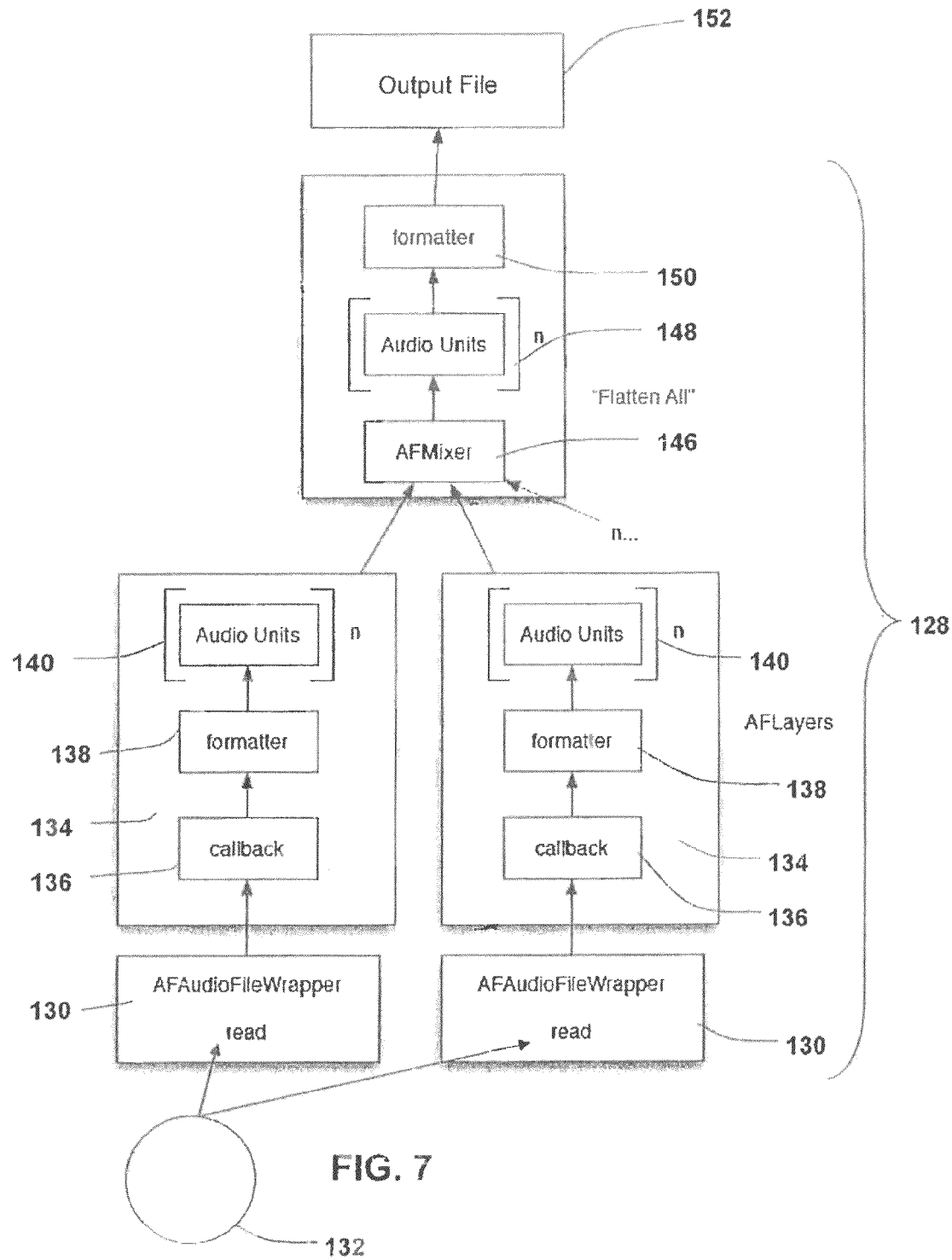
FIG. 7 is a schematic flowchart of a Flatten All function according to an embodiment of the invention.

Referring to FIG. 7, "Flatten All" 128 command generally includes a similar series of functions, but applied to multiple layers (the number of multiple layers being represented in FIG. 7 using the variable designation "n . . . "). For each AFLayer 134, an AFAudioFileWrapper function 130 reads the corresponding audio content from disk 132 and stores them in separate memory locations. Callback function 136 for each AFLayer 134 then retrieves the corresponding audio file from each separate memory location where it was placed by AFAudioFileWrapper function 130. The retrieved audio files for each AFLayer 134 are formatted by formatter 138 and processed through any number of user-selected audio units 140 (the number of multiple units 140 being represented in the figures using the variable designation "n"). The processed audio content from each separate AFLayer 134 is then combined via AFMixer 146, which then passes the mixed audio through any number of audio units 148 selected by the user and applicable globally. The processed audio is then formatted by final formatter 150 into the selected file type and written into final audio file 152.

Figure 9:
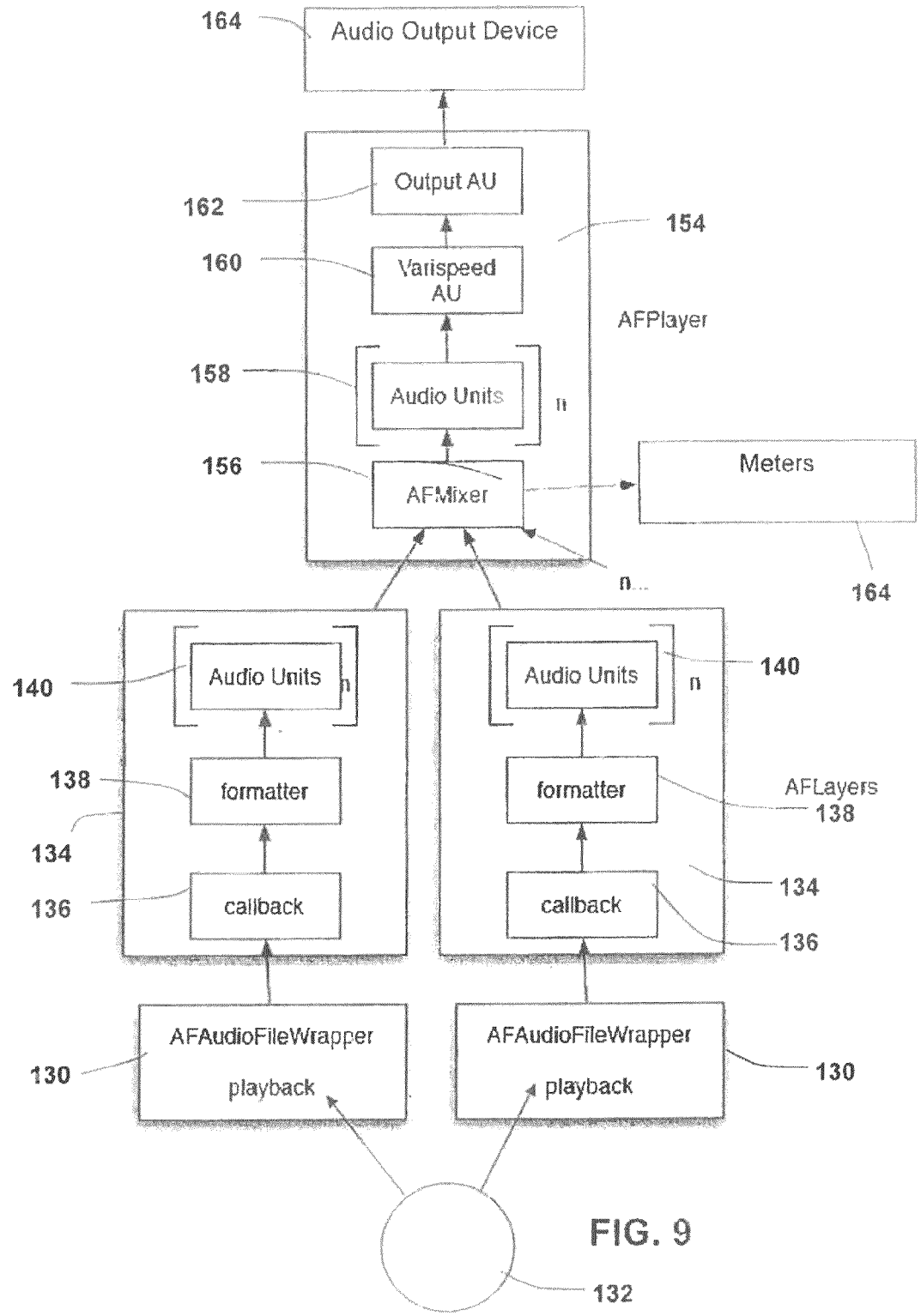
FIG. 9 is a schematic flowchart of a Playback function according to an embodiment of the invention.

It will be readily appreciated by those of skill in the art that playback of an audio document containing layers 110 is accomplished using processes as discussed above, but with the output being an amplifier or speaker rather than a computer file. Referring now to FIG. 9, for each AFLayer 134, its corresponding audio content is read from disk 806 by AFAudioFileWrapper function 130 and stored in a separate memory location. Callback function 136 for each AFLayer 134 then retrieves the corresponding audio information from the separate memory location. The audio information for each AFLayer 134 is again formatted through formatter 138 and processed through any number of user selected audio units 140. AFPlayer 154 generally includes AFMixer 156, audio units 158, Varispeed AU 160, and Output AU 162. The audio content from each separate AFLayer 134 is combined through the AFMixer 156, which then passes the mixed audio information through any number of audio units 158 applied by the user. The mixed audio may also passed off to meters 164 to allow users to visually monitor the audio, such as with the display meters depicted in FIGS. 19A-C and more fully described hereinbelow. The mixed audio is passed through a Varispeed AU function 160 that speeds up or slows down the playback of the audio as specified by the user, such as with the GUI controls depicted in FIGS. 11F-J. The Output AU audio unit 162 retrieves the processed audio and interfaces with an audio output device 164 such as the computer's audio output tools 106 to play back the audio.

As will be appreciated by those skilled in the art, audio editor 100 of the invention may be compatible with other audio programs, computer systems, operating platforms, and the like. A MACINTOSH® computer and operating systems and a Core Audio program are exemplary of only one embodiment and in no way limit the applications and uses of the invention in general and other embodiments in particular.

As previously mentioned, the audio file editor of the invention provides an intuitive graphical user interface (GUI). The audio file editor, via the GUI, simplifies layer and file management and editing and is described with reference to FIGS. 10-18.

GUI 166 generally includes a document window 168, menu structure 170, and tool set 172. Document window 168 generally includes waveform bar 174, overview bar 176, playback bar 178, information bar 180, location bar 182, edit list bar 184, and channels bar 186.

Figure 10A:
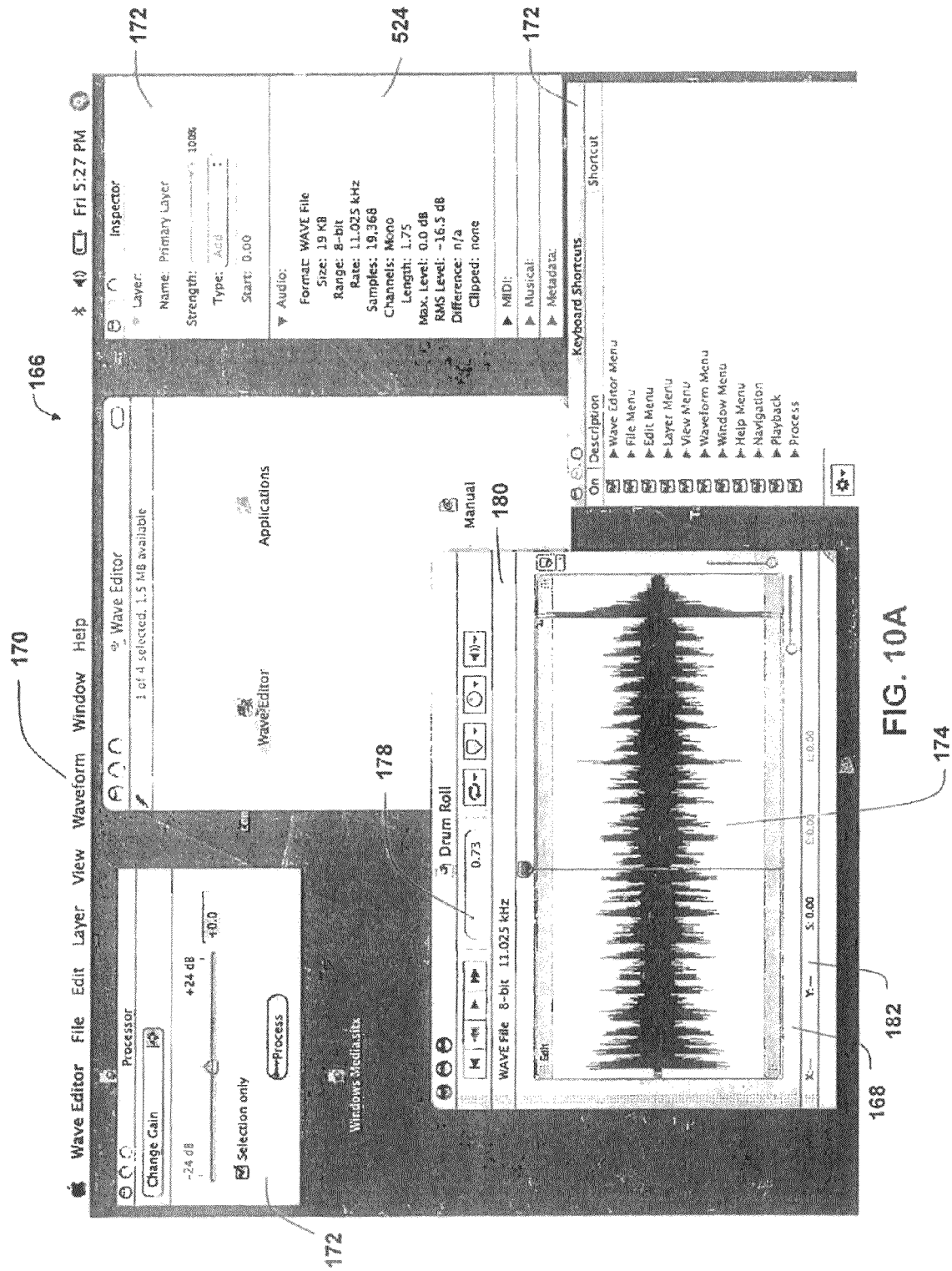
FIG. 10A is a screen-shot depiction of a graphical user interface (GUI) according to an embodiment of the invention.
Figure 10B:
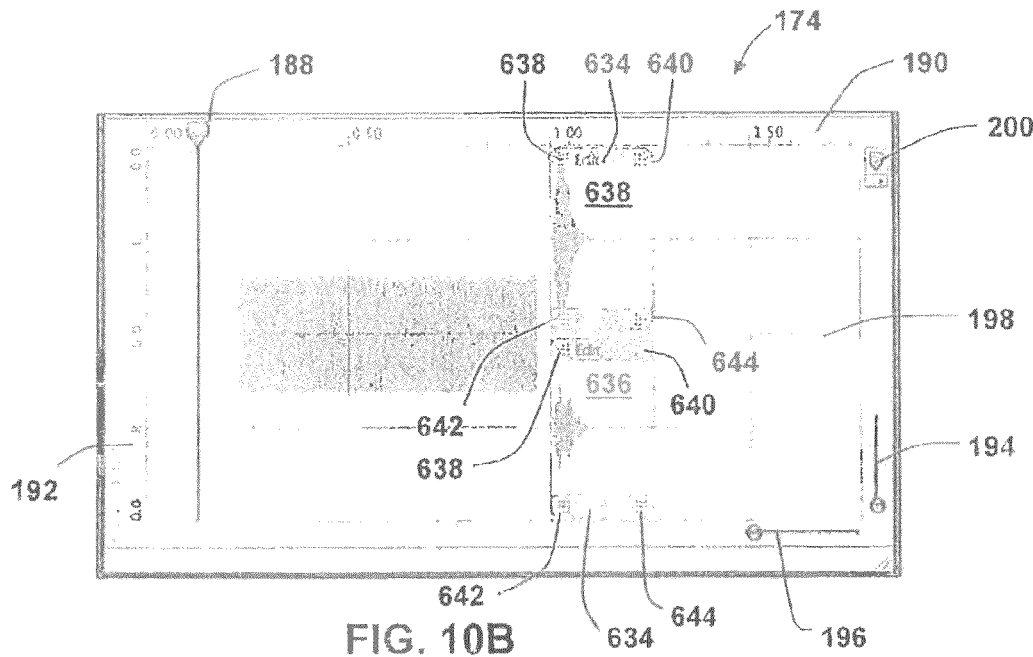
FIG. 10B is a screen-shot depiction of the Waveform bar of a GUI according to an embodiment of the invention.

Waveform bar 174, depicted in more detail in FIG. 10B, displays an audio document graphically represented as a waveform or combination of multiple waveforms. Waveform bar 174 also shows the position of any labels, of playback head 188, as well as the rulers 190, 192. Waveform zoom 194 and scroll 196 controls are at the bottom right of waveform bar 174. These waveform zoom 194 and scroll 196 control sliders control the amount of zoom, and if zoomed in on a displayed waveform 198, a scroll bar is displayed (not depicted).

Playback head 188 indicates the current playback position. Clicking on playback head 188 and dragging it moves the playback position. Clicking in an empty area above waveform 198 moves playback head 188 to that position. Pressing the Command key and clicking on playback head 188, then dragging up or down with the mouse, zooms in on waveform 198, centered on the location of playback head 188.

Labels (not depicted) are displayed in the area above waveform 188. The various types of labels, including markers, slices, regions, and loops, may be displayed in contrasting colors to enable easy visual differentiation. A user may click on the label heads and drag them to move their position. Labels may exist separately for each layer, so labels that are not in the active layer are dimmed and not editable. Pressing the Command key and clicking on a label head, then dragging up or down with the mouse, zooms in on the waveform centered on the location of the label. Label well 200 is on the upper right side of waveform 198. To add a new label, a user may click-hold and drag a label marker from well 200 and drop it onto waveform 198 to add a new label. Single clicking on well 200 changes the type of label.

Rulers 190, 192, are displayed around waveform 198 to the top and left. Rulers 190, 192 use the current units as specified in View menu 272, which is described in more detail hereinbelow.

Figure 10C:
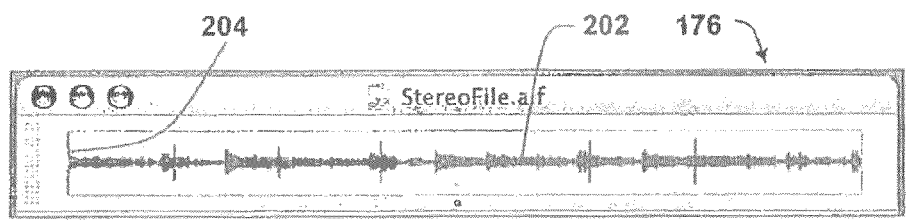
FIG. 10C is a screen-shot depiction of the Overview bar of a GUI according to an embodiment of the invention.
Figure 10D:
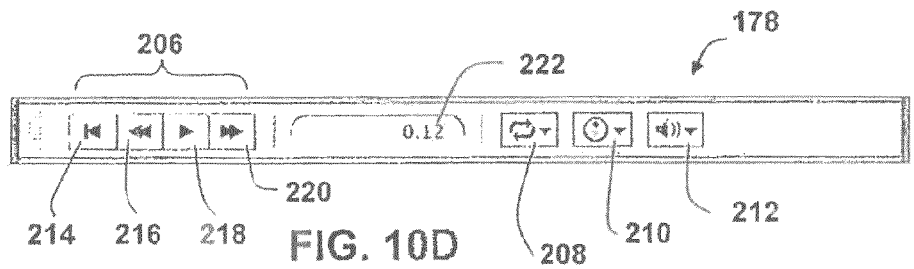
FIG. 10D is a screen-shot depiction of the Playback bar of a GUI according to an embodiment of the invention.

Overview bar 176, depicted in more detail in FIG. 10C, displays the entire combined waveform of the current file. Overview waveform 202 is the sum of all of the channels and all of the layers (with respect to the strength of the layer). Vertical line 204 indicates the position of playback head 188 with respect to overview waveform 202.

Playback bar 178 depicted in more detail in FIG. 10C, contains the controls and playback information for the current audio document. Playback bar 178 generally includes transport buttons 206, Repeat Mode button 208, Varispeed button 210, and Volume button 212. Transport buttons 206 generally include Back button 214, Rewind button 216, Play/Stop button 218 and Forward button 220. Back button 214 moves playback head 188 to the start of the audio file (time zero). Rewind button 216 quickly slides playback head 188 earlier in time as the button is held. Play/Stop button 218 begins play from the current playback head position, and also functions as a stop button during play operation. Forward button 220 quickly slides playback head 188 forward in time as the button is held. Adjacent transport buttons 206 is text field 222, which displays the current position of playback head 188 using the current time units. Text field 222 may be user editable, with playback head 188 automatically moving to the specified position when the Return key is pressed.

Repeat Mode button 208 brings up a popup list of Repeat Mode types. When "Off" is selected, no repeating takes place during playback. When "Selection" is chosen, playback loops the current selection. When "Playback Loop" is selected, playback loops the currently selected "playback loop." A playback loop is a loop label that has been selected as the one to be referenced for playback. When "Entire File" is selected, the entire audio file is repeated from beginning to end.

Varispeed button 210 pops up a slider that enables the user to speed or slow playback of the entire file by up to one octave (1020 cents). Holding down the Shift key while dragging the slider snaps to semitones. Holding down the Command key snaps to zero. Volume button 212 pops up a slider that enables the user to change the playback output volume of the document.

Figure 10E:
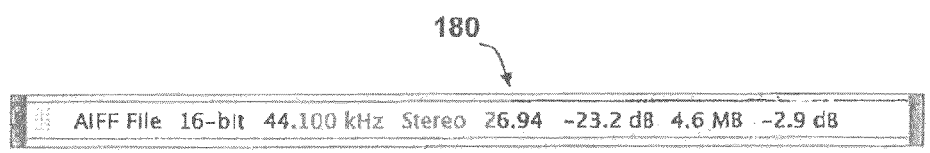
FIG. 10E is a screen-shot depiction of the Information bar of a GUI according to an embodiment of the invention.
Figure 10I:
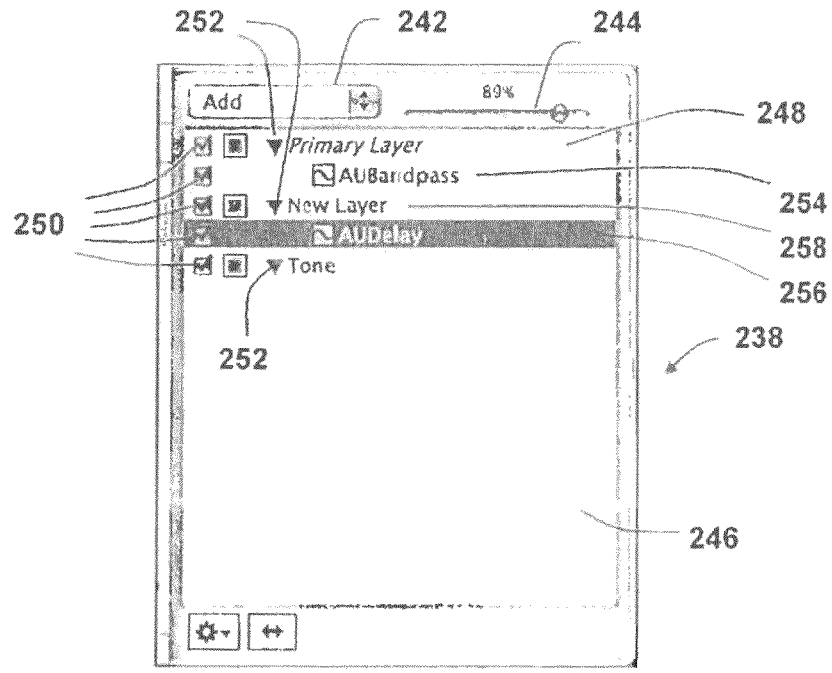
FIG. 10I is a screen-shot depiction of the Layers drawer of a GUI according to an embodiment of the invention.

Information bar 180, depicted in detail in FIG. 10E, displays specific details about the audio being edited. Information listed in information bar 180 may include type, bit range and sample rate, but may also include any other desired information concerning the current audio selection.

Location bar 182, depicted in detail in FIG. 10F, displays details about the position of the cursor and any current selection in waveform 198. The "X" and "Y" designations in the display indicate the cursor position using current time units. The "S", "E" and "L" designations indicate the start, end and length, respectively, of the current selection using current units.

Edit list bar 184, partially depicted in FIG. 10G, is a table of the edits in a document. Rather than displaying edits graphically in block form in a waveform view as described elsewhere herein, edit list bar 184 shows the locations, fade in/out times, and other parameters of all edits in table form.

Popup list button 224 on the top left is used to indicate and select for which channel edits are listed in the table. Matching edits in all channels may be modified when Edit all channels switch 226 is selected. Playback head 188 is displayed to the left of table 228. Similar to the playback head display in waveform bar 174, it points to the edit that contains the current playback head location.

Table 228 generally includes a number of columns 230, some of which may not be displayed simultaneously, due to display space constraints. Columns 230 may include, without limitation, columns for:

Name—the name of the edit (when the text is italicized, the edit is a link);

Channels (Chnls)—the channels to which the listed edit has a match (modifying this edit while the "Edit all channels" switch is on will modify all the matching edits);

Active (•)—the active state;

Lock (lock icon)—the lock state;

Start—the start position in the current time units;

End—the end position in the current time units;

Length—the length in the current time units;

Fade In Type (green upward icon)—the fade-in shape;

Fade In—the fade-in length in the current time units;

Fade Out Type (green downward icon)—the fade-out shape;

Fade Out—the fade-out length in the current time units;

Gain—the amount of cut or boost in dB;

Crossfade Type (green X icon)—the crossfade position type;

Crossfade Length—the length of the crossfade with the next edit in the current time units;

Color—the color of the edit; and

Invert Phase—the phase switch for the edit.

Edits can be dragged to an edit list bar 184 associated with another document as a form of copying or linking. Moreover, edit list bar 184 may be set up to make links whenever possible when edits are dropped from other documents.

Channels bar 186, depicted in FIG. 10H, displays information regarding the channels in a document. Channels may be turned on or off using checkboxes 232 to the left of each channel. The +234 and −236 buttons in the lower left-hand corner may be used to add or delete channels from the document.

Figure 10J:
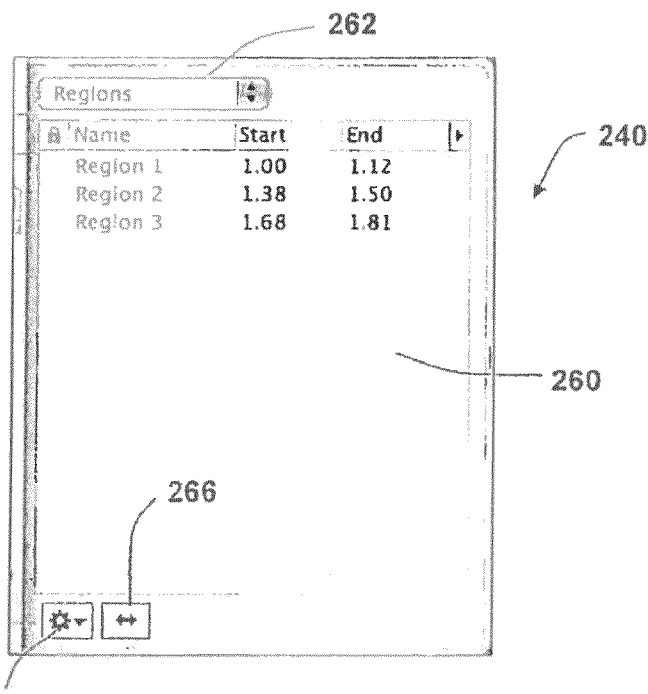
FIG. 10J is a screen-shot depiction of the Labels drawer of a GUI according to an embodiment of the invention.

Waveform bar 174 may further include user modifiable and selectively hideable parameter lists, known in the OS X vernacular as "drawers." In an embodiment of the GUI 166 of the present invention, waveform bar 174 generally includes a layers drawer 238 (FIG. 10I) and a labels drawer 240 (FIG. 10J). Layers drawer 238 generally displays details about the various layers of audio in the document as well as their Audio Units 140 and fades.

Popup menu 242 indicates the type of audio combining used by the currently selected layer. Slider 244 enables adjustment of the strength of combination of the current layer, from 0-100%. Table 246 displays a list of layers in the document. Layer 248, displayed at the top of table 246 and designated "Primary Layer," is permanent and cannot be moved or removed.

Checkboxes 250 enable or disable the layer with which each is associated. If a layer is disabled, it is not displayed in the waveform or heard upon playback. Each layer further is associated with a triangle 252, which enables expanding or collapsing a list of the fades and effects associated with the layer. In the example depicted in FIG. 10I, for instance, AUBandpass 254 is an effect associated with Primary Layer 248, while AUDelay 256 is an effect associated with New Layer 258.

Labels drawer 240, depicted in FIG. 10J, generally displays information about the labels in the document. Table 260 lists the labels of the type selected in popup box 262. Cog button 264 at the bottom actuated a popup menu (not depicted) with commands for working with labels. Dual-arrow button 266 switches the position of drawer 240 from one side of the document window to the other.

Figure 12A:
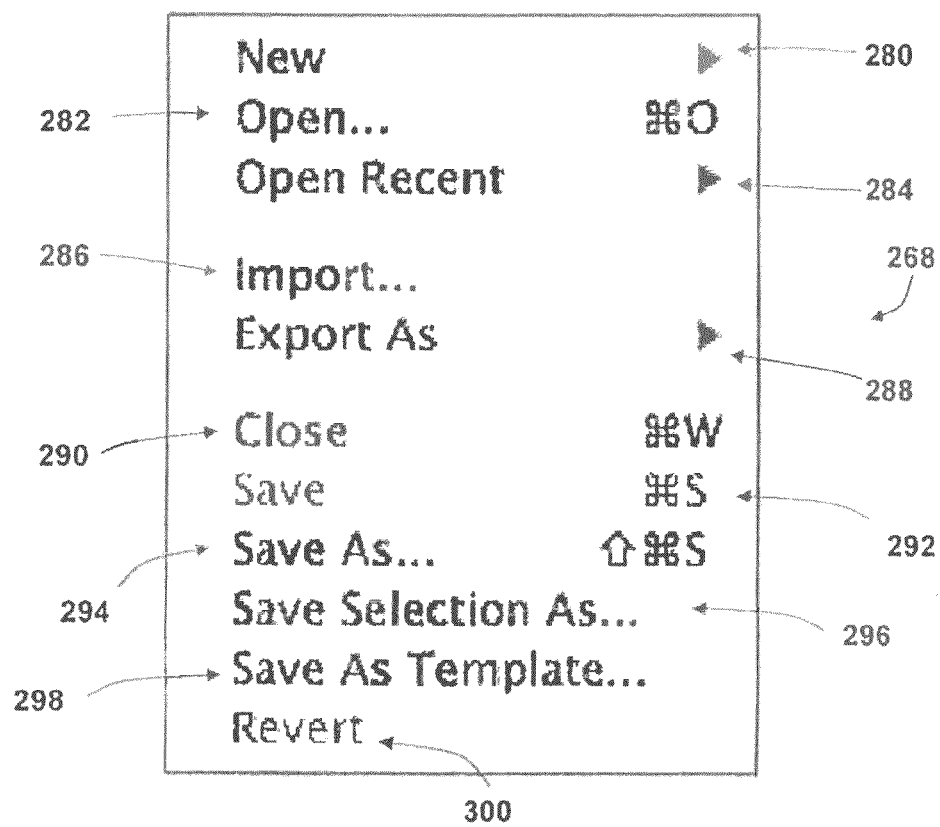
FIG. 12A is a screen-shot depiction of a File menu of a GUI according to an embodiment of the invention.

Menu structure 170 generally includes File menu 268, Edit menu 270, View menu 272, Waveform menu 274, Layer menu 276, and Window menu 278. As depicted in FIG. 12A, File menu 268 lists commands for managing audio files. New command 280 presents a list of the installed document templates. Choosing Default (not depicted) will open a new empty document with the template chosen in the document preferences. Selecting a named template will open a new empty document using the chosen template. The Open command 282 presents a typical standard file open panel such as is known in the art where a user can choose an audio document to open. Open Recent 284 presents a list of the most recently opened files. Selecting a file from the displayed list immediately opens the file. Import 286 again presents a standard open panel where a user can choose an audio file to import. The chosen file is put into a new untitled (and unsaved) document. Export As 288 presents a list of file types in which a user can export the current audio file. Specific settings for the particular file type are presented in a typically formatted save panel. Close 290 attempts to close the frontmost document within the currently active window. If the document has changes and is unsaved, audio editor 100 may prompt the user to save any changes before exiting the program. Save 292 saves the current state of the file to disk. The Save command 294 is only available if the active file has been saved previously or was opened from a file on disk. Save As 296 presents a typical standard file save panel such as is known in the art where the user can choose the name and location for the document to be saved. Options for the specific file type are presented as needed. Save Selection As 298 presents a standard Save panel in which the user can choose the name and location to save the selected portion of the document to be saved. Again, options for specific file types are presented as needed. Save As Template 300 enables a user to save the current document window settings as a template that can be used to apply to other documents or used in creating new files.

Templates may include, without limitation, window size, position, size and state of bars, drawer sizes and states, the time and range formats, the repeat mode, the current label table display, autoscroll state, rulers display, and volume and varispeed settings. Finally, Revert 932 reverts back to the previously saved copy of the document.

Figure 12B:
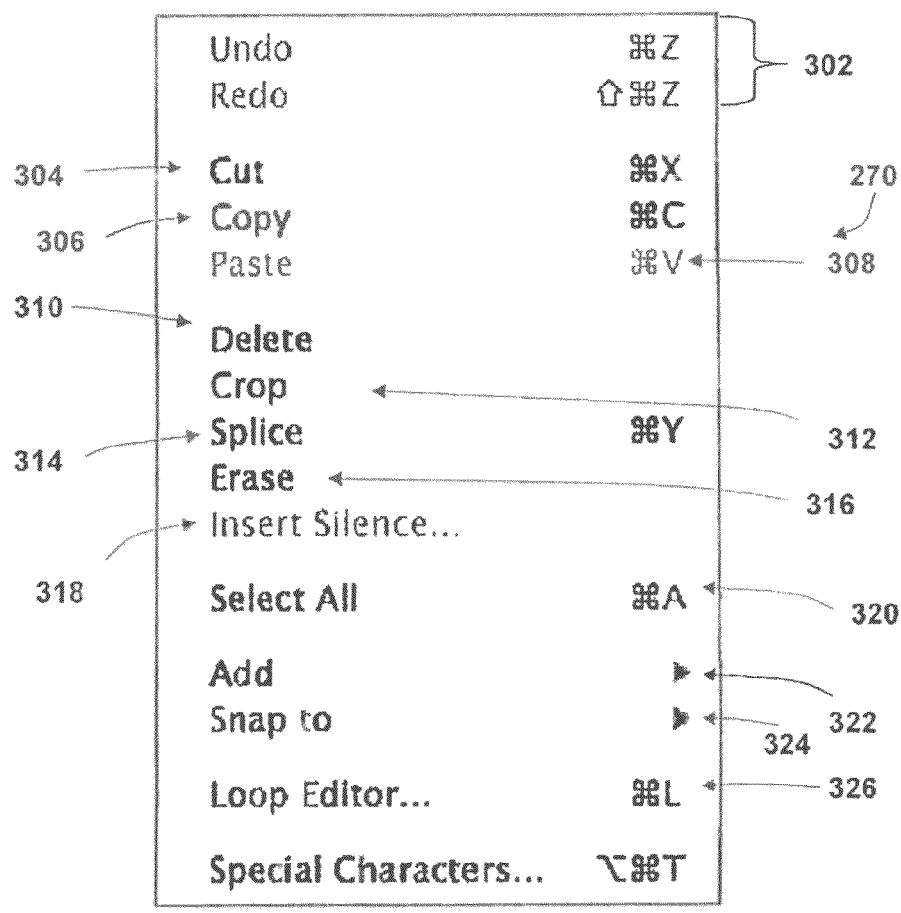
FIG. 12B is a screen-shot depiction of an Edit menu of a GUI according to an embodiment of the invention.

Edit menu 270 as depicted in FIG. 12B generally includes several commands operative on the file currently being edited in audio editor 100. For example, Undo and Redo 302 undo and redo actions done on the current document. Cut 304 places the selected audio on a pasteboard within the OS X environment and removes it from the document being edited. Cut in place (obtained by holding down the option key) (not depicted) places the selected audio on the pasteboard and erases it from the document. Copy 306 places a copy of the selected audio on the pasteboard, but leaves the selected audio within the document. Paste 308 inserts the cut or copied audio from the pasteboard into the current document at a selected point or, if the selection is a range, replaces the selection range with it. Paste as Link (obtained by holding down the option key) (not depicted) inserts the audio into the pasteboard at the selection point or, if the selection is a range, replaces the selection range with it. The pasted audio is not copied to the current document, but instead is pointing to the source file. Delete 310 removes the selected audio from the current document. Crop 312 removes the audio outside of the selection from the document. Crop In Place (obtained by holding down the option key) (not depicted) erases the audio outside of the selection from the document. Splice 314 splits the audio selection into one or more Edits. Erase 316 erases the selected audio. Insert Silence 318 presents a panel prompting the user for the length of silence to be inserted and inserts blank audio at the insertion point. Select All 320 selects all the audio in the document. Add 322 displays a list of labels that can be added into the document at the given insertion point or selection. If the selection is an insertion point, the user can add a Marker or a Slice (not depicted). If the selection is a range, the user can add a Region or a Loop (not depicted). Snap To 324 displays a list of items to which draggable items can "snap" while being dragged. Loop Editor 326 opens the loop editor window for the current document.

Figure 12C:
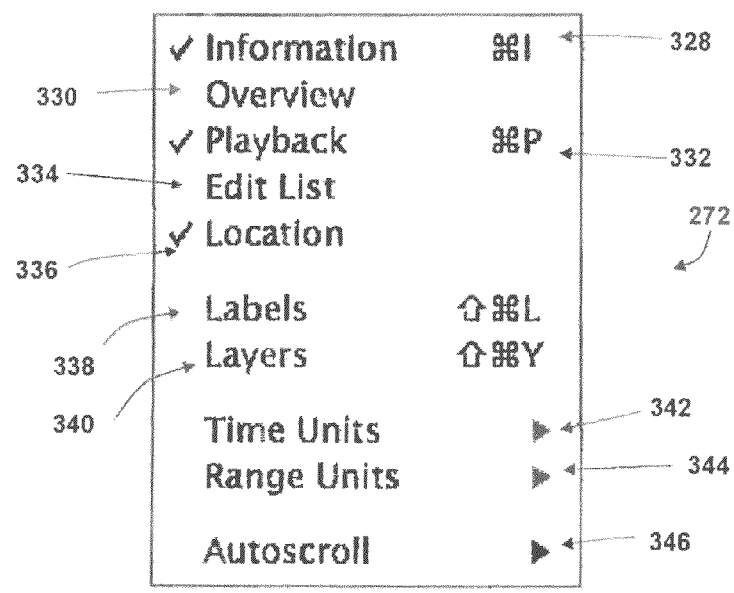
FIG. 12C is a screen-shot depiction of a View menu of a GUI according to an embodiment of the invention.

View menu 272, as depicted in FIG. 12C, presents functions for manipulating the display of tool and menu bars, drawers, and parameters. For example, Information 328 toggles display of an information bar in the front document displayed in the window. Overview 330 toggles display of an overview bar in the front document displayed in the window. Playback 332 toggles display of a playback bar in the front document displayed in the window. Edit List 334 toggles display of an edit list bar in the front document displayed in the window. Location 336 toggles the display of location texts in the front document displayed in the window. Labels 338 toggles the visibility of a labels drawer for the front document displayed in the window. Layers 340 toggles the visibility of a layers drawer for the front document displayed in the window. Time Units 342 selects the type of units used to measure time with in the front document displayed in the window. Range Units 344 selects the type of units used to measure dynamic range in the front document displayed in the window. Autoscroll 346 toggles autoscroll features for the front document displayed in the window.

Figure 12D:
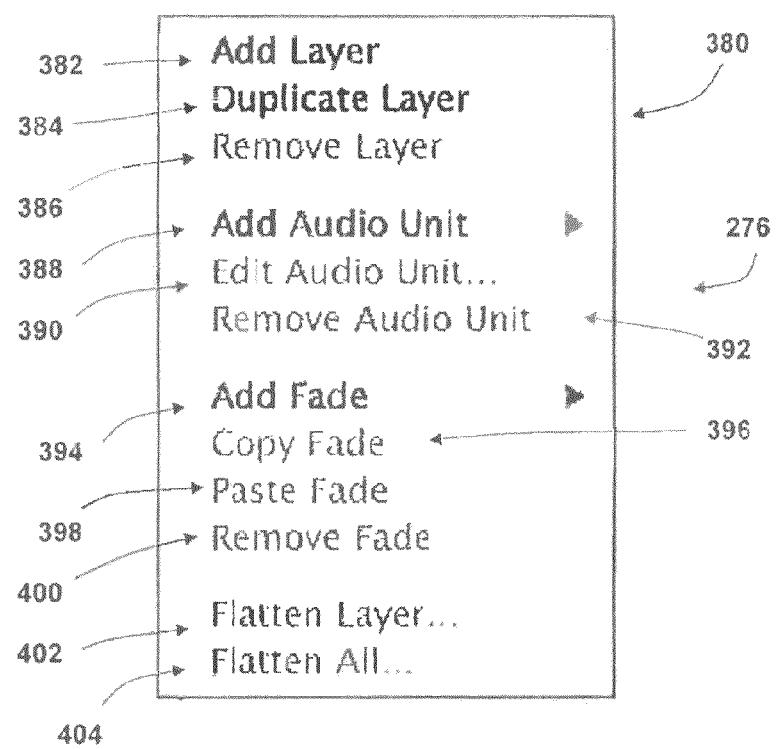
FIG. 12D is a screen-shot depiction of a Layer menu of a GUI according to an embodiment of the invention.
Figure 12E:
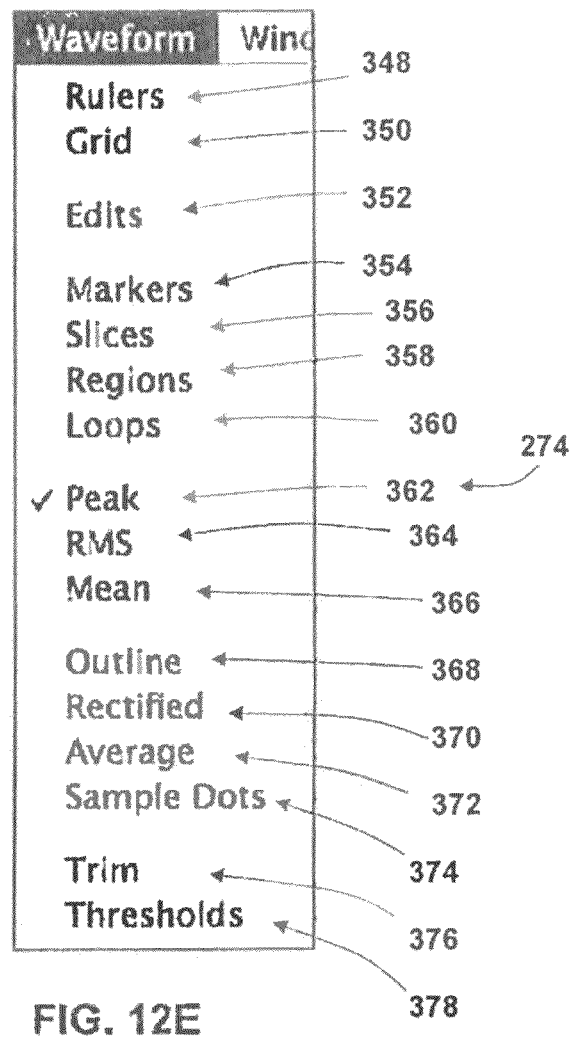
FIG. 12E is a screen-shot depiction of a Waveform menu of a GUI according to an embodiment of the invention.
Figure 12F:
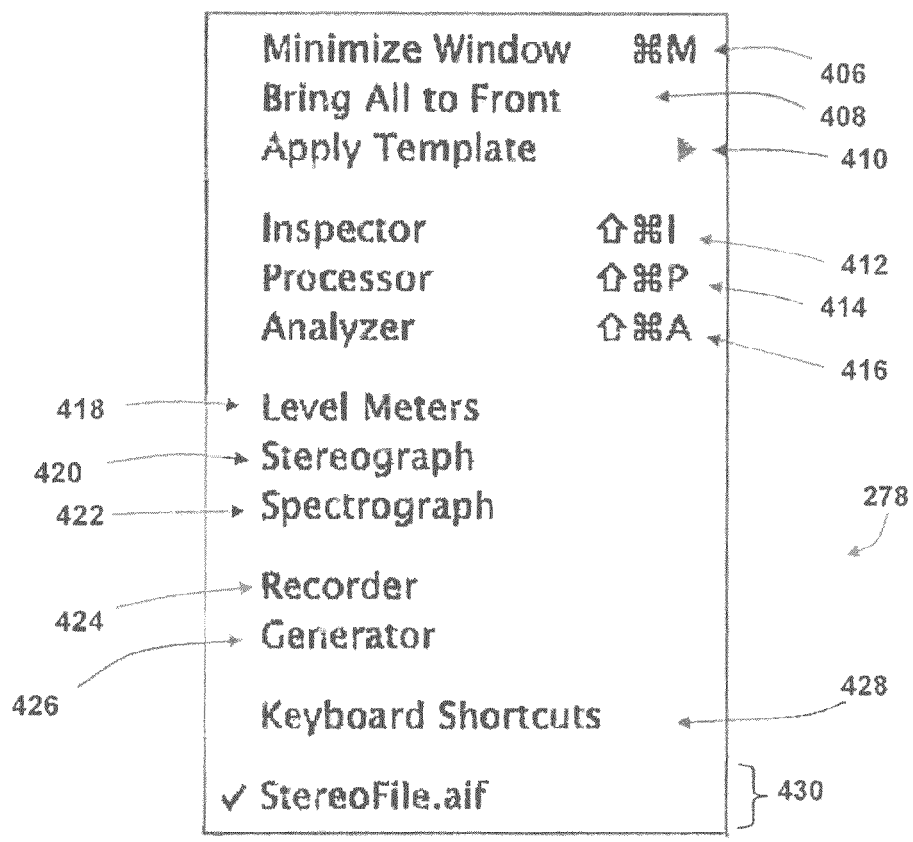
FIG. 12F is a screen-shot depiction of a Window menu of a GUI according to an embodiment of the invention.

Waveform menu 274 as depicted in FIG. 12E generally includes commands operative to alter the mode of graphical display of waveforms being edited in audio editor 10. Rulers 348 toggles display of rulers in the current document. Grid 350 toggles display of the grid in the current document. Edits 352 toggles display of the SmartEdits in the current document. Similarly, Markers 354, Slices 356, Regions 358, and Loops 360 toggle display of markers, slices, regions and loops in the current document, respectively. Peak 362, RMS 364, and Mean 366 toggle the display of waveforms in the document so as to display in the selected relative values. Outline 368, Rectified 370, Average 372, and Sample Dots 374 toggle the appearance of waveforms in the document. Trim 376 toggles preview of trim in the current document. Finally, Thresholds 378 toggles preview of thresholds in the current document.

Layer menu 276 as depicted in FIG. 12D provides commands for manipulating audio layers in the current document. Add Layer 382 adds a new, empty layer to the current document. Duplicate Layer 384 duplicates the currently selected layer. Remove Layer 386 removes the currently selected layer. Add Audio Unit 388 adds an audio unit onto the currently selected layer. Edit Audio Unit 390 displays the GUI of the selected audio unit. Remove Audio Unit 392 removes the currently selected audio unit. Add Fade 394 adds a fade to the currently selected layer's selection. Copy Fade 396 copies the currently selected fade to the OS X pasteboard. Paste Fade 398 pastes the fade on the pasteboard to the current selection on the currently selected layer. Remove Fade 400 removes the currently selected fade. Flatten Layer 402 combines all of the audio units and fades on the currently selected layer. Flatten All 404 combines all of the audio units and fades on each respective layer, then combines all the layers together to make a single "flat" audio file.

Window menu 278 generally includes commands for manipulating the display of windows in audio editor 100. Minimize Window 406 and Bring All to Front 408 are well known commands commonly used in OS X applications. Apply Template 410 sets the current document's window settings to the chosen template. Inspector 412, Processor 414, Analyzer 416, Level Meters 418, Stereograph 420, Spectrograph 422, Recorder 424, Generator 426, and Keyboard Shortcuts 428 open up their respective tool panels as are more fully described elsewhere herein. Documents currently open in audio editor 100 are listed at the bottom of the menu 278 in space 430.

Figure 11A:
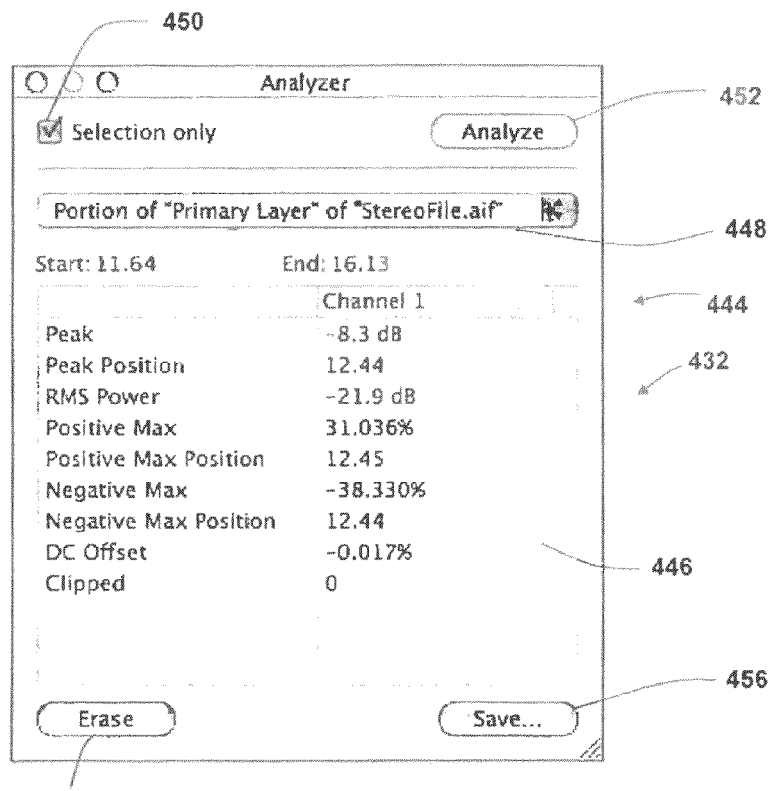
FIG. 11A is a screen-shot depiction of an Analyzer tool of a GUI according to an embodiment of the invention.

Audio editor 100 may also include a tool set 172 for creating, manipulating, and displaying audio information and files. In an embodiment, tool set 172 generally includes analyzer tool 432, processor tool 434, inspector tool 436, loop editor tool 438, recorder tool 440, and generator tool 442. Analyzer tool 432 generally is useful for extracting and saving information relative to an audio file or portion thereof. Analyzer tool 432 may be initiated from Analyzer command 416 on Window menu 278. Analyzer tool 432 may present an information and control window 444 as depicted in FIG. 11A. Window 444 generally includes parameter display region 446 and file list box 448. To analyze audio, a portion of an audio document may be selected with Selection Only checkbox 450 on, or the entire file may be analyzed by deselecting Selection Only checkbox 450. Analyze button 452 may then be selected to initiate the analysis. The results of the analysis then appear in parameter display region 446. Each analysis performed is saved in memory until erased with Erase button 454 or audio editor 100 quits. The current analysis may be saved as an XML file for use in other programs by clicking Save button 456.

Figure 11B:
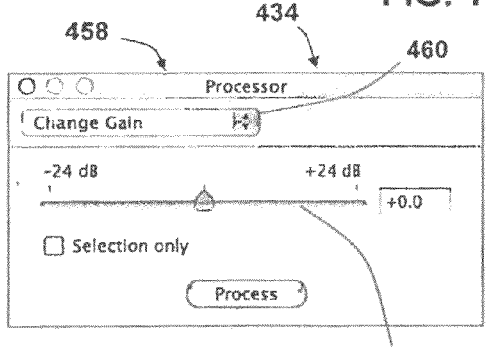
FIG. 11B is a screen-shot depiction of a first portion of the Proceesor tool of a GUI according to an embodiment of the invention.
Figure 11C:
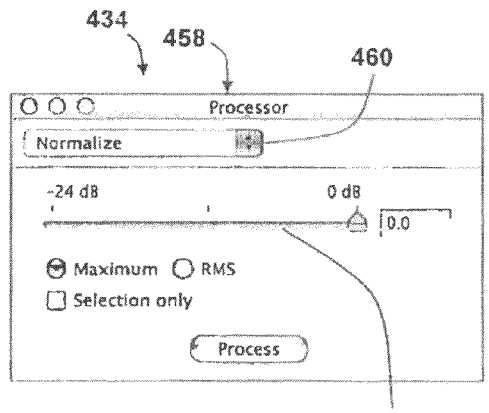
FIG. 11C is a screen-shot depiction of a second portion of the Proceesor tool of a GUI according to an embodiment of the invention.
Figure 11D:
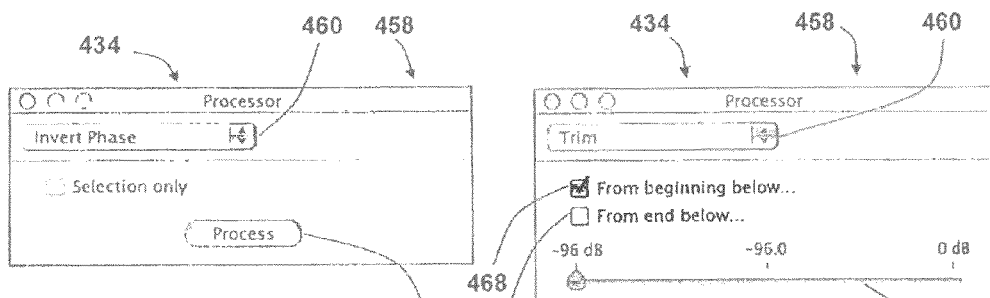
FIG. 11D is a screen-shot depiction of a third portion of the Proceesor tool of a GUI according to an embodiment of the invention.

Processor tool 434 generally enables a number of audio processes to be applied to the active layer (or selection of the layer) in the frontmost document. When actuated with Processor command 414 from Window menu 278, an information and control window 458 is displayed, with varying content depending on the function selected in list box 460 as depicted in FIGS. 11B-N. When Change Gain is selected in list box 460 as depicted in FIG. 11B, a slider control 462 is displayed, enabling the user to selectively alter the level of a selected audio segment by a variable amount between −24 and +24 dB. When Normalize is selected in list box 460 as depicted in FIG. 11C, a slider control 464 is displayed, enabling the user to selectively alter the level of selected audio so that the maximum or RMS level of the selected audio matches the value set by slider control 464. If Invert Phase is selected in list box 460 as depicted in FIG. 11D, the user is enabled to invert the phase of selected audio by clicking button 466.

Figure 11E:
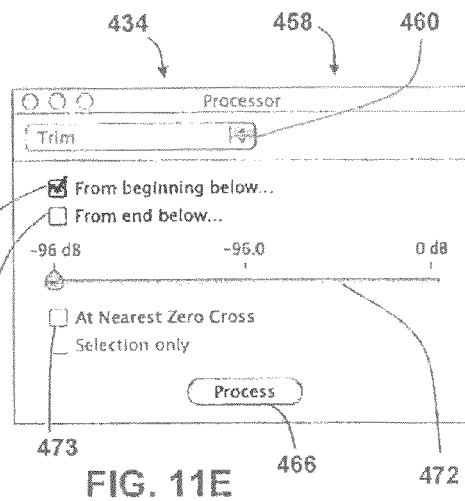
FIG. 11E is a screen-shot depiction of a fourth portion of the Proceesor tool of a GUI according to an embodiment of the invention.
Figure 11F:
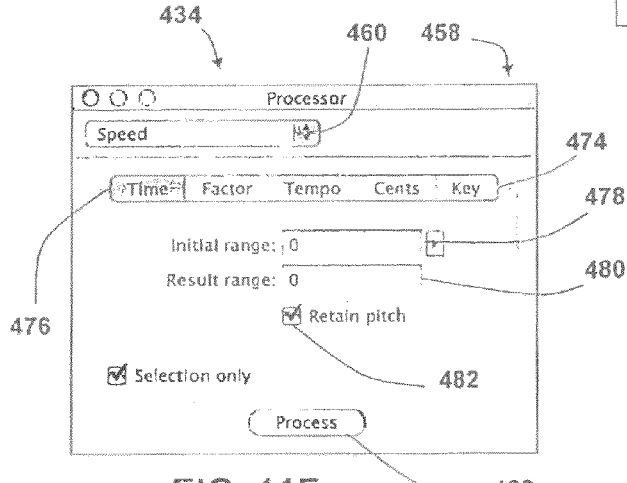
FIG. 11F is a screen-shot depiction of a fifth portion of the Proceesor tool of a GUI according to an embodiment of the invention.

The Trim function, when selected in list box 460 as depicted in FIG. 11E, enables a user to remove portions of audio from the beginning and/or the end of a selected audio portion below a specified threshold. When From beginning below . . . checkbox 468 is selected, audio is removed from the beginning of the document. When From end below . . . checkbox 470 is selected, audio is removed from the end of the document. Slider control 472 enables the user to specify the threshold below which audio is removed. When At nearest zero cross checkbox 473 is selected, the audio is removed at the nearest available zero crossing point so the trim process avoids clicking.

When Speed is selected in list box 460 as depicted in FIGS. 11-F-J, button bar 474 is displayed, enabling the user to select from five options for changing the speed, and optionally the pitch, of a selected audio segment. Selecting Time button 476 as depicted in FIG. 11F causes text boxes 478, 480, to be displayed in window 458 corresponding to an initial range and a result range value, respectively. The user may enter a length value, or choose a value to automatically enter with a popup, into Initial range field 478, and a corresponding value to Result range field 480. When Process button 466 is subsequently clicked, the selected audio segment will be adjusted to a length corresponding to the value entered in Result range field 480. To keep the pitch of the audio the same, Retain pitch checkbox 482 may be selected.

Figure 11G:
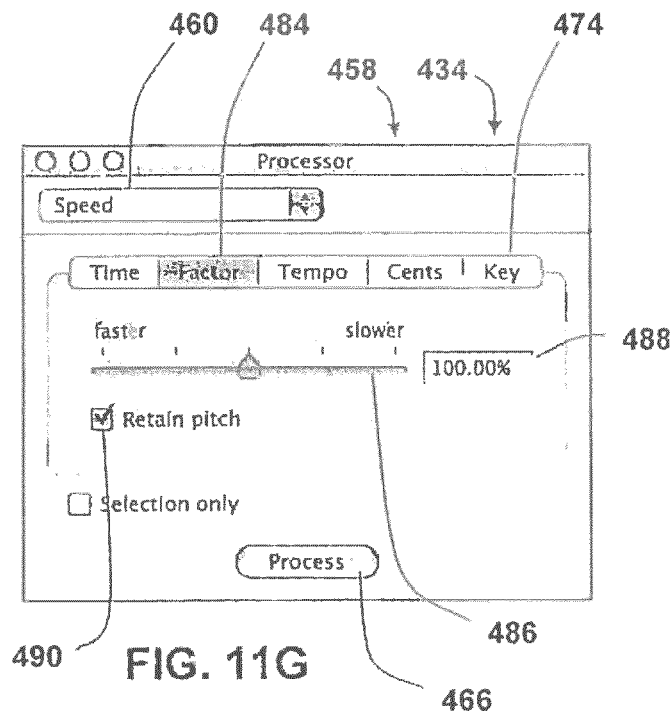
FIG. 11G is a screen-shot depiction of a sixth portion of the Proceesor tool of a GUI according to an embodiment of the invention.
Figure 11H:
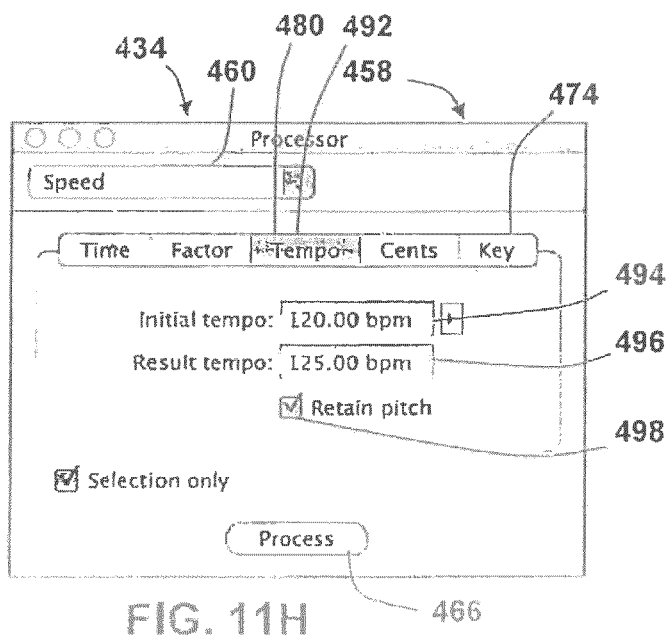
FIG. 11H is a screen-shot depiction of a seventh portion of the Proceesor tool of a GUI according to an embodiment of the invention.

If Factor button 484 is selected as depicted in FIG. 11G, slider control 486 is displayed, enabling a user to speed up or slow down a selected segment of audio by a percentage factor displayed in text box 488. Once again, to keep the pitch of the audio the same, Retain pitch checkbox 490 may be selected. Selecting Tempo button 492 displays text boxes 494, 496, corresponding to an initial tempo and a result tempo value, respectively in beats per minute. The user may enter a value, or choose a value to automatically enter with a popup, into Initial tempo field 494, and a corresponding value to Result tempo field 496. When Process button 466 is subsequently clicked, the selected audio segment will be adjusted to a tempo corresponding to the value entered in Result tempo field 496. To keep the pitch of the audio the same, Retain pitch checkbox 498 may be selected.

Figure 11I:
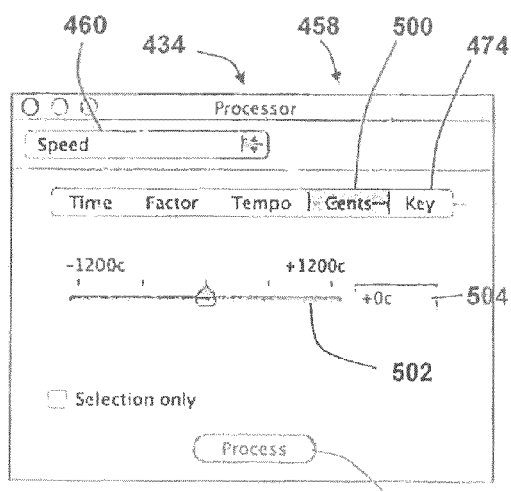
FIG. 11I is a screen-shot depiction of an eighth portion of the Proceesor tool of a GUI according to an embodiment of the invention.
Figure 11J:
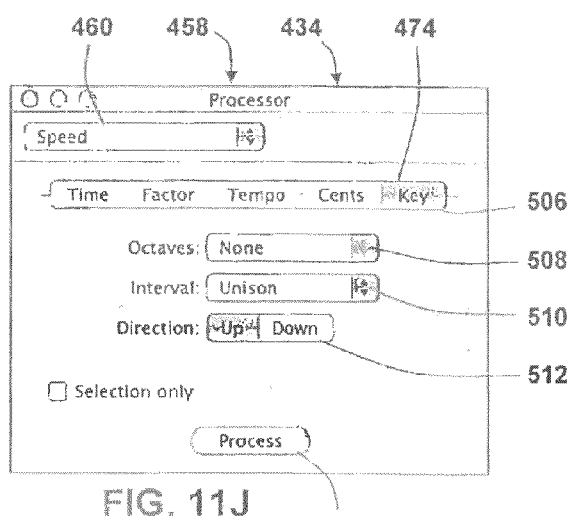
FIG. 11J is a screen-shot depiction of a ninth portion of the Proceesor tool of a GUI according to an embodiment of the invention.

In similar fashion, when Cents button 500 is selected as depicted in FIG. 11I, slider control 502 is displayed, enabling a user to speed up or slow down a selected segment of audio by a number of musical cents displayed in text box 504, wherein 100 musical cents is equivalent to one-half step. Finally, if Key button 506 is selected as depicted in FIG. 11J, list boxes 508, 510, and buttons 512 are displayed, enabling the user to pitch-shift the selected audio by a musical description specified by selecting items from list boxes 508, 510 and buttons 512.

Figure 11K:
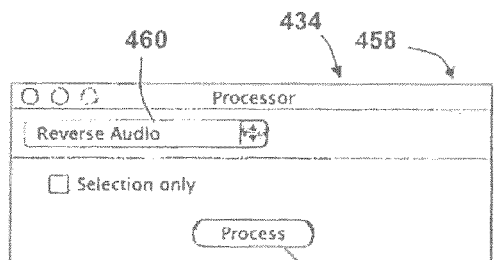
FIG. 11K is a screen-shot depiction of a tenth portion of the Proceesor tool of a GUI according to an embodiment of the invention.
Figure 11L:
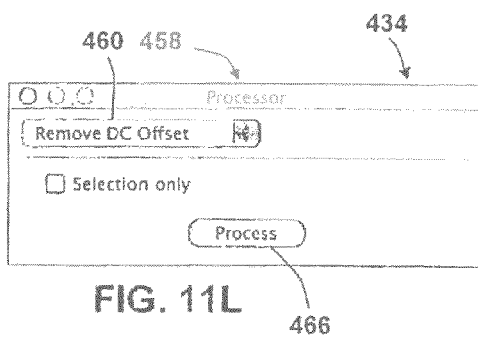
FIG. 11L is a screen-shot depiction of an eleventh portion of the Proceesor tool of a GUI according to an embodiment of the invention.

When Reverse Audio is selected in list box 460 as depicted in FIG. 11K, the user is enabled to reverse the selected audio segment by clicking Process button 466. Similarly, if Remove DC Offset is selected in list box 460 as depicted in FIG. 11L, the user is enabled to remove any DC component from the selected audio segment by clicking Process button 466.

Figure 11M:
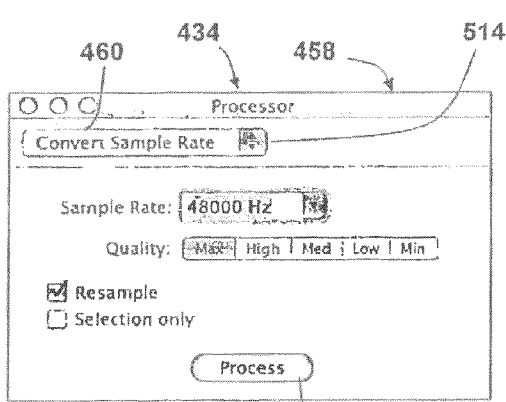
FIG. 11M is a screen-shot depiction of a twelfth portion of the Proceesor tool of a GUI according to an embodiment of the invention.

The user may adjust the sample rate of a selected audio segment by selecting Convert Sample Rate in list box 460 as depicted in FIG. 11M. The user may select any of a set of pop-up items displayed in list box 514, or may simply type in a value. When Process button 466 is clicked the selected segment is physically converted to the specified sample rate.

Figure 11N:
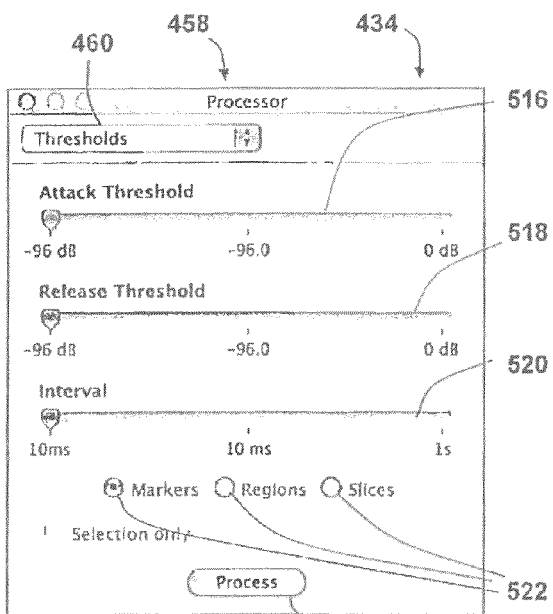
FIG. 11N is a screen-shot depiction of a thirteenth portion of the Proceesor tool of a GUI according to an embodiment of the invention.

Moreover, a user may create and modify new thresholds by selecting Thresholds in list box 460 as depicted in FIG. 11N. Slider controls 516, 518, and 520 corresponding to Attack, Release, and Interval thresholds respectively are displayed, enabling the user to adjust each separately. Further, the type of label being created can be specified with radio buttons 522. A Marker describes a single location in an audio file and may also have a name. Markers are supported in almost all audio file formats. A Slice describes a single location in an audio file. Slices are commonly found in musical files such as ReCycle, ACID and Apple Loops. A Region describes a range in an audio file and may have an optional name. Regions are most commonly found in Sound Designer II formats (WAV files support regions, but AIFF files do not).

Figure 13A:
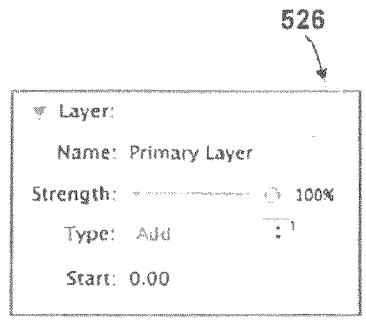
FIG. 13A is a screen-shot depiction of a layer portion of the Inspector tool of a GUI according to an embodiment of the invention.
Figure 13B:
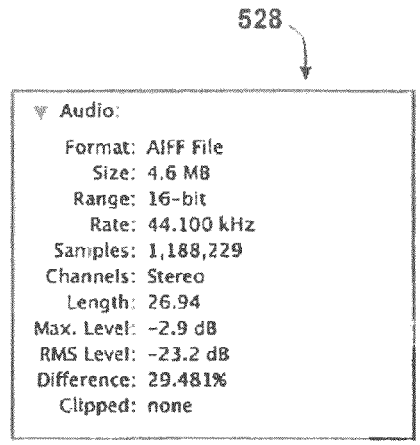
FIG. 13B is a screen-shot depiction of a audio portion of the Inspector tool of a GUI according to an embodiment of the invention.
Figure 13C:
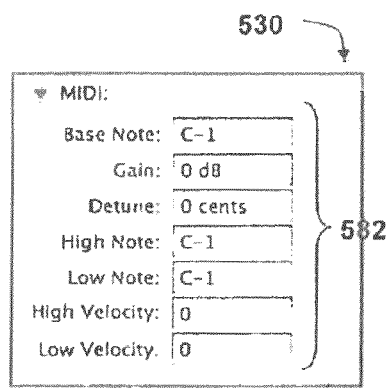
FIG. 13C is a screen-shot depiction of a MIDI portion of the Inspector tool of a GUI according to an embodiment of the invention.
Figure 13D:
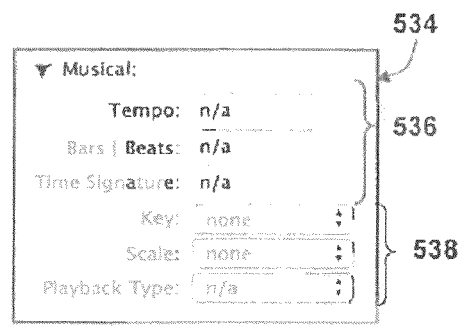
FIG. 13D is a screen-shot depiction of a musical portion of the Inspector tool of a GUI according to an embodiment of the invention.
Figure 13E:
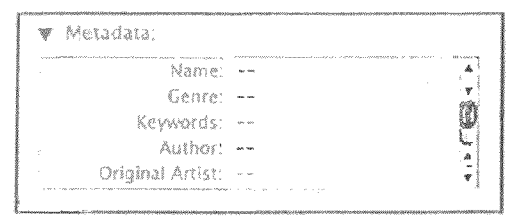
FIG. 13E is a screen-shot depiction of a metadata portion of the Inspector tool of a GUI according to an embodiment of the invention.
Figure 14:
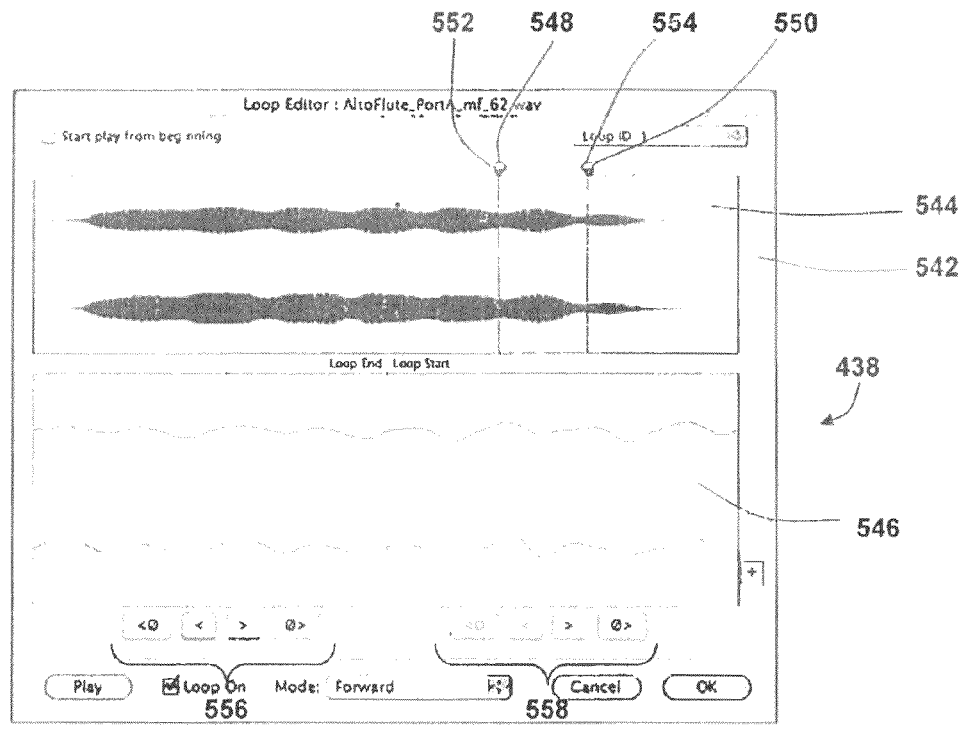
FIG. 14 is a screen-shot depiction of a Loop Editor tool of a GUI according to an embodiment of the invention.

Inspector tool 436 generally displays detailed information about the frontmost audio document (and in particular panes just the active layer of the document). Information and control window 524 is divided into 5 sections depicted in FIGS. 13A-E. Layer section 526 as depicted in FIG. 13A, displays details and parameters of the currently selected layer. Audio section 528 depicted in FIG. 13B displays various details relative to the audio information in the currently selected layer. MIDI section 530 depicted in FIG. 13C displays various MIDI details of the currently selected document. If the underlying file format supports MIDI, the text boxes 532 enable editing of the displayed parameters. Musical section 534 depicted in FIG. 13D displays information regarding tempo, time signature and other musical data for the frontmost document. Again, if the underlying audio file format supports alterations to the displayed parameters, text boxes 536 and list boxes 538 are user editable. Metadata section 540 depicted in FIG. 13E displays various other informational fields that may be associated with the document.

Loop editor tool 438 provides a convenient way to hear and edit loop points in an audio document. In an embodiment, loop editor tool 438 displays an information and control window 542, which generally includes a waveform view window 544 and a loop detail window 546. Waveform view window 544 displays the entire audio file. Markers 548, 550, show the beginning of the loop and the end of the loop respectively. Marker handles 552, 554, can be grabbed and moved with the mouse to alter the loop start and end points.

Loop detail window 546 displays the beginning and the end of the loop back-to-back, as it would be played. The zoom level is set at one sample per pixel. The audio plays from the left and through to the right of the window. In window 546, the loop end is on the left, ending at the center point, and the loop start begins at the halfway point and continues on. Button bars 556, 558, below each side of the loop section enable the marker to be adjusted with precision. The "" symbol moves the marker to the next zero crossing point.

Figure 16:
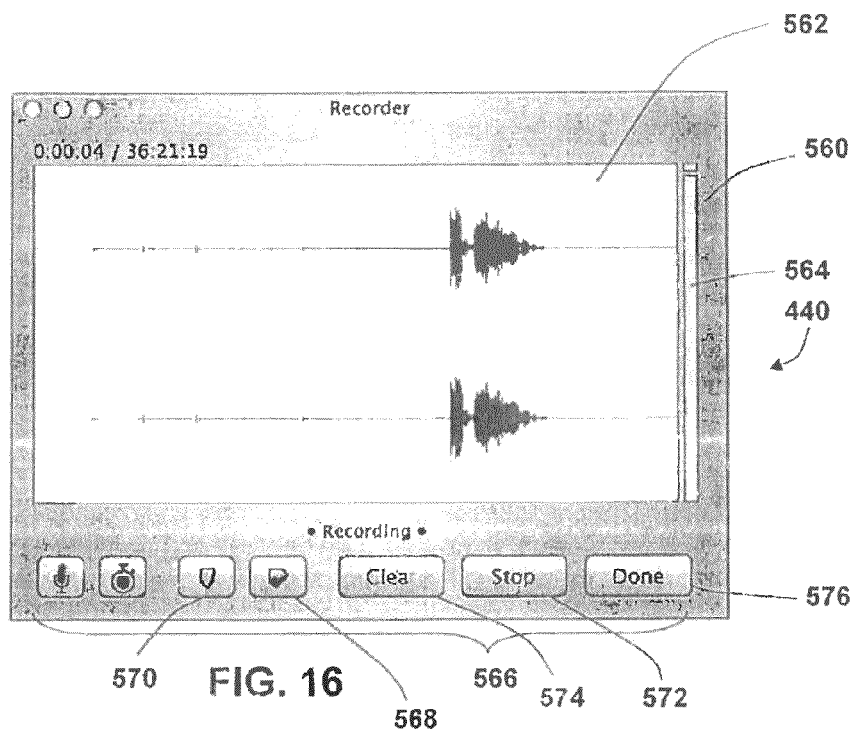
FIG. 16 is a screen-shot depiction of a Recorder tool of a GUI according to an embodiment of the invention.

Recorder tool 440 provides a utility for recording audio into a new file. Information and control window 560 as depicted in FIG. 16 generally includes waveform display 562, input meter bar 564, and control buttons 566.

In operation, recording may be commenced by clicking start button 568. Waveforms (one for each recorded channel—from 1 to 32 channels) move from right to left displaying the previous few seconds of recorded audio. A marker may be set during recording by clicking marker button 570. The recording may be manually stopped by clicking Stop button 572. The recorded information may be erased with Clear button 574. When a recording is completed, a new document with the recording is created by clicking Done button 576.

Figure 15:
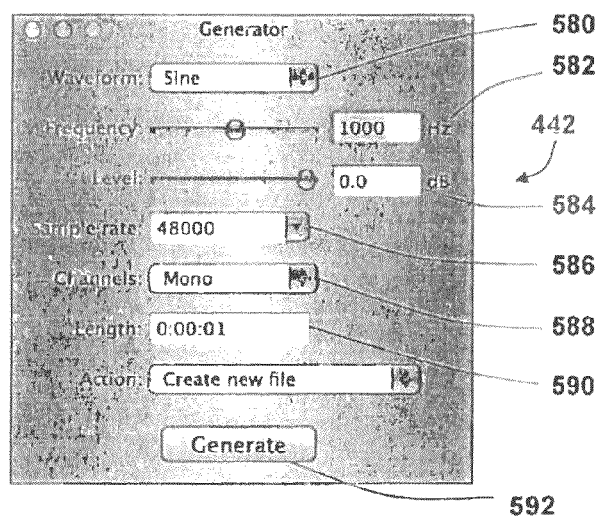
FIG. 15 is a screen-shot depiction of a Generator tool of a GUI according to an embodiment of the invention.

Generator tool 442 is generally a utility for creating fundamental waveforms. It may create, without limitation, sine waves, square waves, sawtooth waves and triangle waves of any frequency, as well as white and pink noise. Information and control window 578 as depicted in FIG. 15 generally includes various controls and text boxes for specifying the desired parameters of the waveform to be created. To create a wave, a waveform may be chosen from popup menu box 580. For tonal waveforms, the frequency in Hertz may be specified with slider and control 582. The maximum level of the waveform, the sample rate, the number of channels and the length to generate may be specified with controls 584, 586, 588, and 590 respectively. Once these parameters are specified, Generate button 592 may be clicked to create the new waveform.

Figure 18A:
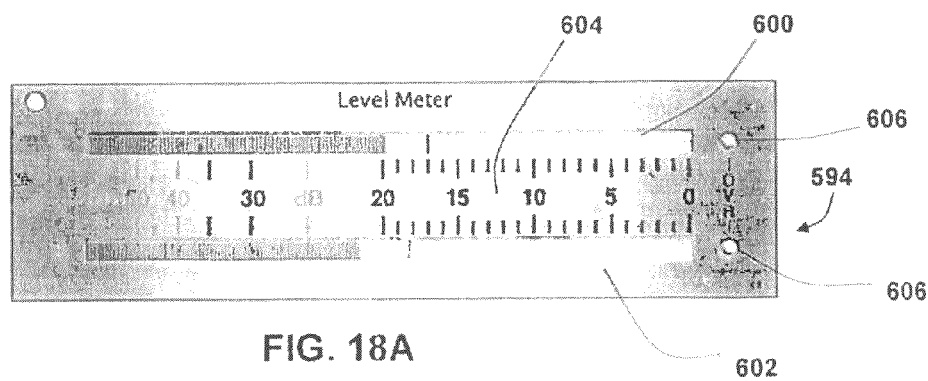
FIG. 18A is a screen-shot depiction of a level meter of a GUI according to an embodiment of the invention.
Figure 18B:
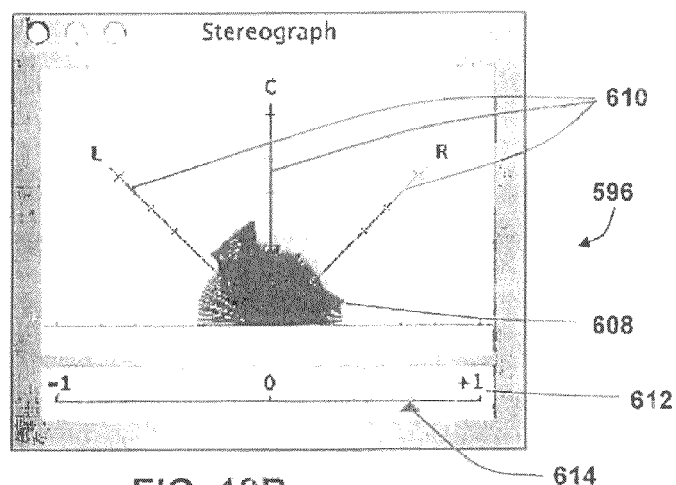
FIG. 18B is a screen-shot depiction of a stereograph of a GUI according to an embodiment of the invention.
Figure 18C:
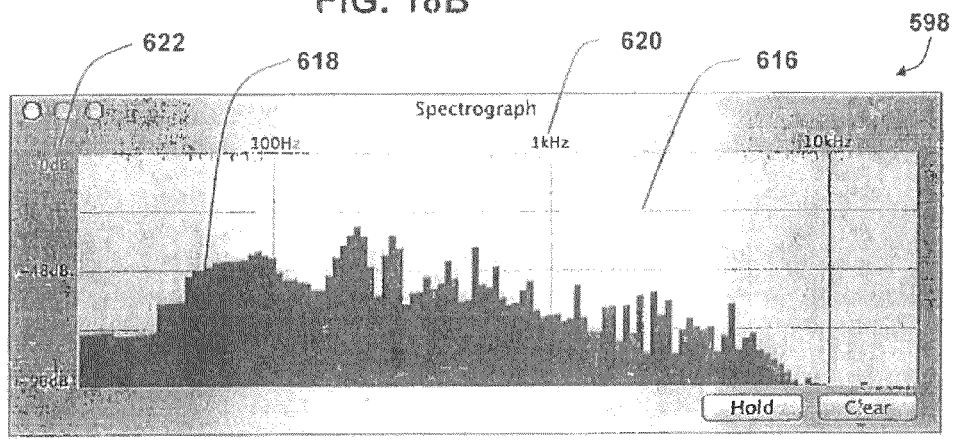

The audio editor 100 may also include metering windows as depicted in FIGS. 18A, 18B, and 18C for monitoring, including level meter 594, stereograph 596, and spectrograph 598. Level meter 594 displays the measurement of the volume of an audio stream, preferably represented in decibels. Ballistics of level meter 594, i.e. rise and fall times, may be user adjustable. Level meter 594 may also have a corresponding contextual menu (not depicted) listing all the options displayable by level meter 594. Level meter 594 generally includes a pair of bar graph displays 600, 602, corresponding to left and right stereo channels respectively. Indicia 604 is provided between bar graph displays 600, 602, corresponding to volume levels in decibels. Indicator lights 606 may be provided for each of the bar graph displays 600, 602, to indicate an overmodulation condition occurring in the channel.

Stereograph 596 provides a graphical display corresponding to the stereo phasing of the the audio stream. In an embodiment, stereograph 596 presents a representation 608 showing the general tendency of the audio output, superimposed on splayed lines 610 corresponding to left, center, and right directions. Phase correlation indicator 612 may be provided having pointer 614 which moves on a sliding scale from +1 (for when the audio stream is mono), to 0 (for when the audio stream is stereo), to −1 (for when the audio stream is out-of-phase between right and left channels).

Spectrograph 598 defines window 616 in which a multiplicity of graphical bars 618 are displayed corresponding to the amplitude of audio output at various frequencies. Indicia corresponding to frequency 620 and volume level 622 are displayed along adjacent margins of window 616 to enable user interpretation of the displayed information. Spectrograph 598 may also have a corresponding contextual menu (not depicted) listing all the options displayable by spectrograph 598.

Figure 3A:
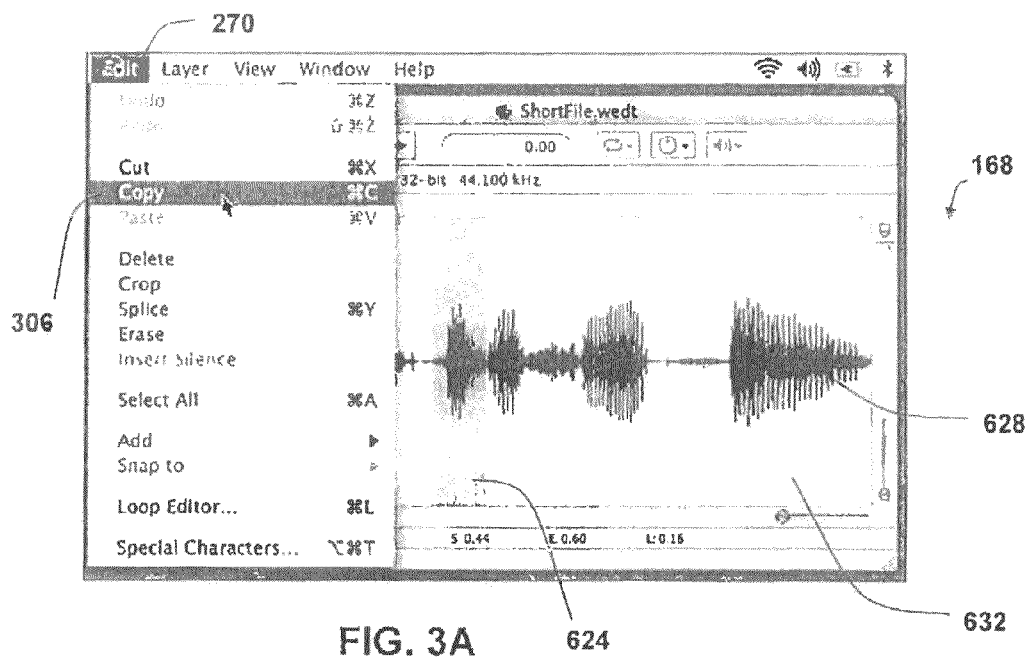
FIG. 3A is an exemplary screen-shot of a first step of editing an audio file using the editor of the present invention.

Audio editor 100, with GUI 166, enables audio editing tasks to be performed in a very similar fashion to editing tasks in a graphical word processor, rendering them efficient and user-friendly. With reference now to FIGS. 3A-E, editing of an audio file will be described for purposes of example. FIG. 3A depicts a portion 624 of audio waveform 628 selected in document window 168. Selection of portion 624 can be accomplished by clicking and dragging the computer cursor over the portion of waveform 628 to be selected. Once selected, selected portion 624 may be indicated in document window 168 with shading as depicted in FIG. 3A. or by any other selection and illustration methods can also be used, as is understood by those skilled in the art. A user can also choose to zoom in and out any area of waveform 628. In this example, portion 624 of waveform 626 is then copied by selecting Copy 306 from Edit menu 270 as depicted or by using a keyboard or other shortcut.

Figure 3B:
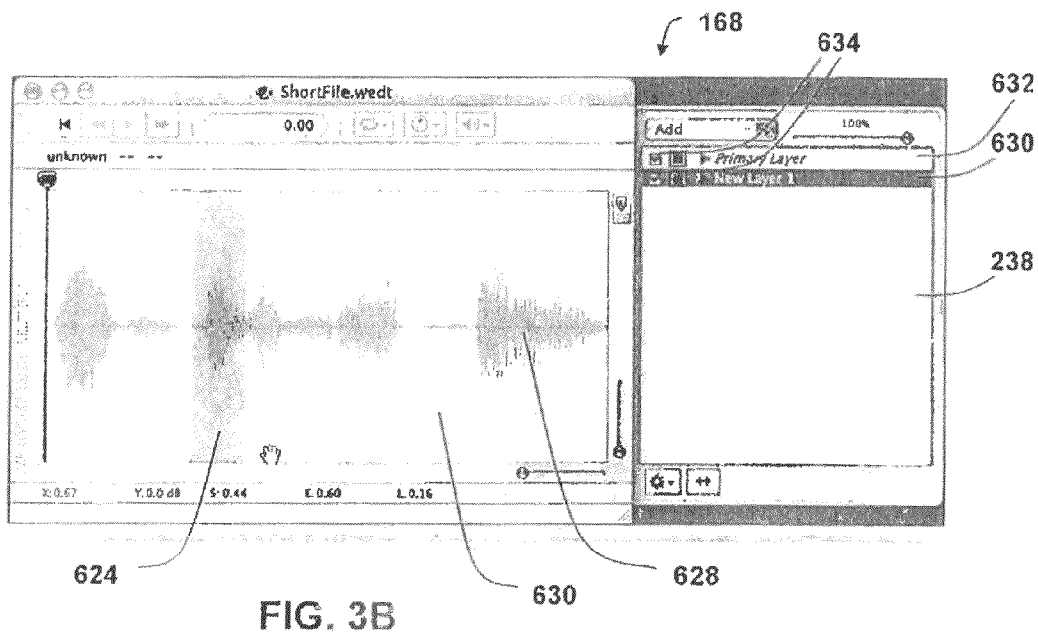
FIG. 3B is an exemplary screen-shot of a second step of editing an audio file using the editor of the present invention.

A new layer may then be added to the document using layer drawer 238 as depicted in FIG. 3B, or by selecting Add Layer 382 from Layer menu 276. Newly added layer 630 is displayed in document window 168 as the topmost layer, with primary layer 632 being "greyed" and sent to the background, as depicted in FIG. 3B. The depiction of a layer within document window 168 as a background layer or the topmost layer is only a visual representation of the layer and does not alter the audio characteristics of the layer. New layer 630 is also listed in layer drawer 238 as "New Layer 1" 630. The layer names and labels shown in layer drawer 238 in this example are default names and can be changed to more descriptive or helpful names as desired. Layers can also be brought to the foreground by highlighting the layer in layer drawer 238. Further, layers can be turned on or off by selecting checkbox 634 in layer drawer 238.

Figure 3C:
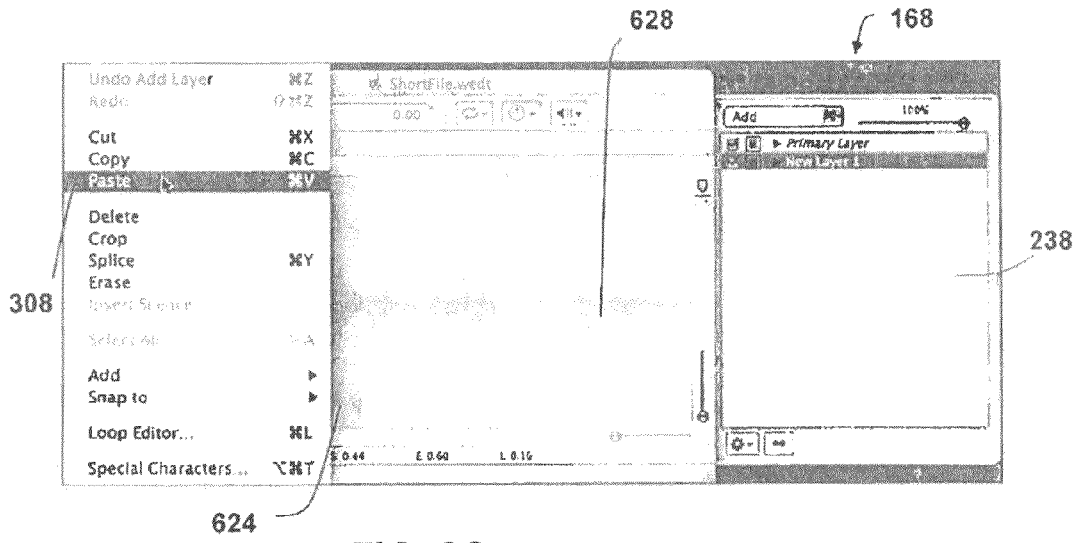
FIG. 3C is an exemplary screen-shot of a third step of editing an audio file using the editor of the present invention.
Figure 3D:
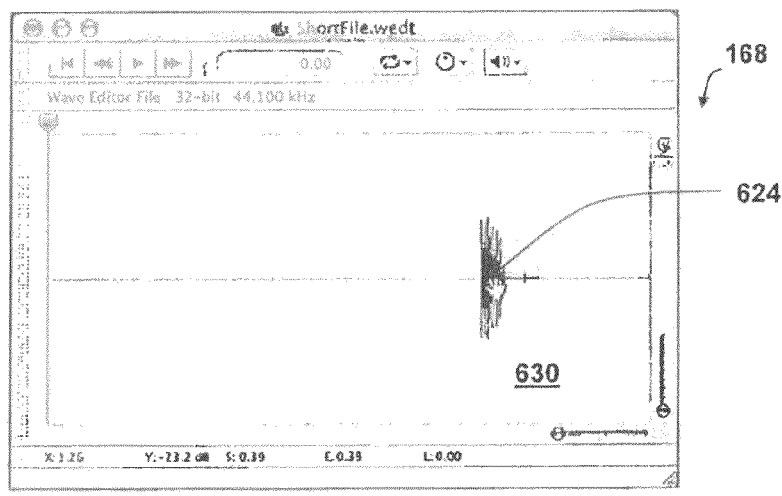
FIG. 3D is an exemplary screen-shot of a fourth step of editing an audio file using the editor of the present invention.

Selected portion 624 is then added to new layer 630 by selecting Paste command 308 from Edit menu 270, as depicted in FIG. 3C. Audio portion 624 is then added to the currently selected layer, in this example new layer 630, as shown in FIG. 3D. Primary layer 632 and waveform 628 is visible as a "greyed" background layer.

Audio portion 624, or any part of layers 630 and 632, can then be edited or manipulated to create a desired audio effect. For example, portion 624 may be manually repositioned by selecting, clicking, and dragging, or more finely positioned by specifying a particular start time in the appropriate menu. Portion 624 can also be dragged to another file (not shown). If portion 624 is of a different format or sample rate as audio in the target document, audio editor 100 can convert portion 624 to match the target document. Moreover, by way of further example, audio portion 624, or any part of layers 630, 632, can be selected and subsequently deleted by using the delete command. Any particular area of layers 630, 632, can be selected and subsequently cropped using the crop command to remove audio portions lying outside of the selected area. This can also be done in one stroke by using the "crop in place" command. Audio portion 624, or any part of layers 630, 632, can be selected and spliced with edits as described in more detail below. Audio portion 624, or any part of layers 630, 632, can also be selected and erased. A segment of silence, whose length is determined by the user via an entry prompt, may be inserted into any part of layers 630, 632.

Audio file editor 100 allows labels to be added to any part of layers 630, 632. Labels describe common properties of many audio file formats. They may include markers, slices, regions and loops. The region label may further provide special actions that combine selected regions into one general region, create an intersection region between two selected regions, and/or move ends of a region to a nearest region's start point. A marker or a slice can be added by selecting an insertion point and choosing the appropriate label from a list displayed by the Add command. A region or a loop can be added by selecting a range and again choosing the appropriate label from the Add command listing.

In an embodiment, the label drawing tool is available under a tools menu similar to that of a word processor. In another embodiment, there may be a graphic bar displaying the available labels that a user can select and drag into a target document. Labels can also have the option of being in a locked state so that they cannot accidentally be removed by the user. A label can be moved to a different location by manually dragging it or by selecting it and specifying the destination. A label of one type can also be converted to a different type. This can be done through a conversion option provided by a tool such as the label drawing tool described above. A selected area between each label can also be saved and extracted to a new file.

Any draggable items, such as labels and fade curves, can be "snapped" together. Audio file editor 100 may also provide smart edits. Smart edits are sections of single-channel audio that are movable, draggable, and sizable and have properties such as fade in or fade out, length or shape, name, and locked status. They may be dragged between documents and moved between channels. Common audio files by default, contain one edit per channel from beginning to end. The Splice command 314, however, can be used to 'splice' an audio document into smaller edits. The resulting edits can then be dragged, while the user performs designated key strokes, to perform adjustments to certain properties. The edits may also be listed in a table form that displays the locations, the lock state, the start and end time units, length, fade in/out and other edit properties.

In operation, to splice an audio file (thereby creating additional edits), a point or a range is selected in document window 168. Splice 314 may then be selected from Edit menu 270. This will create edit box 634 at the edges of the selection as depicted in FIG. 10B. In an embodiment, edit box 634 may be graphically displayed as a generally rectangular overlay 636 with four handles 638, 640, 642, 644, at the four corners of overlay 636. Each handle 1638, 640, 642, 644, may be moved by dragging it with the mouse. The handles may affect the following designated parameters:

Upper left handle 638—edit start point
Upper right handle 640—edit end point
Bottom left handle 642—edit fade in length
Bottom right handle 644—edit fade out length Moreover, dragging a handle 638, 640, 642, 644, while holding down a designated modifier key may produce alternate effects. For example, depressing the Command key before and while dragging modifies the adjacent block, and depressing the Shift key before and while dragging produces an "anchor." When dragging the start or end handle 638, 640, of edit box 634, holding down the shift key will set the anchor at the fade start or end point. When dragging the fade in or out handle 642, 644, of edit 1099, holding down the shift key will set the anchor at the "halfway" point of the fade. Some further examples of results of handle drags with modifier keys include:

Shift-drag start handle 638=Fade In
Shift-drag end handle 640=Fade Out
Command-drag start or end handle 638, 640=Shift splice point
Command-drag fade in handle 642=Pre-crossfade (by pushing)
Command-drag fade out handle 644=Post-crossfade (by pushing)
Shift-command-drag fade in or out handle 642, 644=Centered crossfade
Shift-command-drag start handle 638=Post-crossfade (by pulling)
Shift-command-drag end handle 640=Pre-crossfade (by pulling)

Figure 3E:
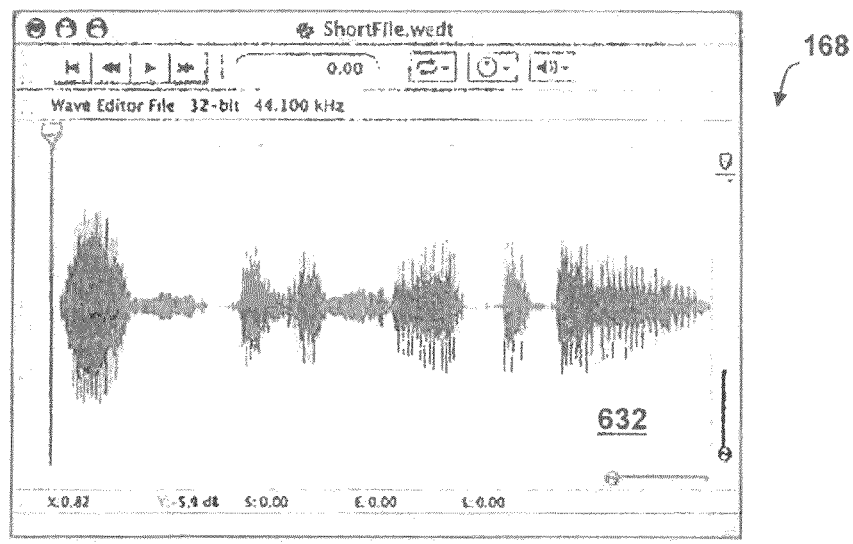
FIG. 3E is an exemplary screen-shot of a fifth step of editing an audio file using the editor of the present invention.

In an embodiment, at least 5 different fade shapes may be available for use in edit:

Linear: a linear volume change, creating −6 dB at the halfway point
Power: a power-based volume change, creating −3 dB at the halfway point
−3 dB: the fade range is reduced by 3 dB
−6 dB: the fade range is reduced by 6 dB
Full: the fade range volume is unchanged Additional layers can also be added, the audio content of layers can be manipulated, effects can be added, and the like, until a desired audio representation is achieved. To then combine all of the individual layers into a single layer, Flatten All command 404 is selected from Layer menu 276. The resultant flattened layer, primary layer 632, is illustrated in FIG. 3E.

The invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A digital audio editing system comprising:
   a computer system; and
   a graphical audio file editor that operates on the computer system, the audio file editor comprising an algorithm for:
   overlaying a first audio information layer with at least a second audio information layer, the first audio information layer being associated with first audio information and a first plurality of audio unit processors that enable editing and modification of the first audio information in real time, the second audio information layer being associated with second audio information different from the first audio information and a second plurality of audio unit processors that enable editing and modification of the second audio information in real time;
   flattening the first audio information layer by permanently applying the first plurality of audio unit processors to the first audio information; and
   saving the flattened first audio information layer and the second audio information layer as a digital file, the first and second audio information layers being distinguishable within the digital file using the audio file editor.

2. The system of claim 1, wherein the algorithm includes flattening the second audio information layer by permanently applying the second plurality of audio unit processors to the second audio information, and saving the flattened first audio information layer and the flattened second audio information layer as a digital file, the first and second audio information layers being distinguishable within the digital file using the audio file editor.

3. The system of claim 2, wherein the algorithm includes combining the first audio information layer and the second audio information layer to create a new single-layer electronic audio file.

4. The system of claim 1, wherein the algorithm includes associating an audio unit processor globally with both the first and second layers to enable editing and modification of the first audio information and second audio information simultaneously in real time.

5. The system of claim 1, wherein the audio unit processors of the first and second pluralities of audio unit processors are selected from the group consisting of: alterations to audio volume or level, matching the maximum or RMS audio level to a value set by the user, inverting the audio phase, altering the beginning or endpoint of a segment of audio, changing the speed or pitch of audio, and converting the sampling rate of audio.

6. An apparatus for editing digital audio files comprising:
   a computer system comprising a processor and an operating system for operating the processor, the processor programmed with an algorithm for:
   overlaying a first audio information layer with at least a second audio information layer, the first audio information layer being associated with first audio information and a first plurality of audio unit processors that enable editing and modification of the first audio information in real time, the second audio information layer being associated with second audio information different from the first audio information and a second plurality of audio unit processors that enable editing and modification of the second audio information in real time;
   flattening the first audio information layer by permanently applying the first plurality of audio unit processors to the first audio information; and
   saving the flattened first audio information layer and the second audio information layer as a digital file, the first and second audio information layers being distinguishable within the digital file.

7. The apparatus of claim 6, wherein the algorithm includes flattening the second audio information layer by permanently applying the second plurality of audio unit processors to the second audio information, and saving the flattened first audio information layer and the flattened second audio information layer as a digital file, the first and second audio information layers being distinguishable within the digital file using the audio file editor.

8. The apparatus of claim 7, wherein the algorithm includes combining the first audio information layer and the second audio information layer to create a new single-layer electronic audio file.

9. The apparatus of claim 6, wherein the algorithm includes associating an audio unit processor globally with both the first and second audio information layers to enable editing and modification of the first audio information and second audio information simultaneously in real time.

10. The apparatus of claim 6, wherein the audio unit processors of the first and second pluralities of audio unit processors are selected from the group consisting of: alterations to audio volume or level, matching the maximum or RMS audio level to a value set by the user, inverting the audio phase, altering the beginning or endpoint of a segment of audio, changing the speed or pitch of audio, and converting the sampling rate of audio.

11. A digital audio editing system comprising:

a computer system comprising a processor, an operating system for operating the processor, an electronic display screen, and a user input device; and a graphical audio file editor that operates on the computer system, the audio file editor comprising an algorithm for:

graphically displaying a representation of a first audio information layer on the electronic display screen, the first audio information layer being associated with first audio information;

associating, with the first audio information, a first audio unit processor that enables editing and modification of the first audio information in real time using the user input device, a representation of the first audio unit processor being graphically displayed on the electronic display screen;

overlaying the first audio information layer with at least a second audio information layer, the second audio information layer being associated with second audio information different from the first audio information;

graphically displaying a representation of the second audio information layer on the electronic display screen;

flattening the first audio information layer by permanently applying the first audio unit processor to the first audio information; and saving the flattened first audio information layer and the second audio information layer as a digital file, the first and second audio information layers being distinguishable within the digital file using the graphical audio file editor.

12. The system of claim 11, wherein the algorithm includes associating the second audio information layer with a second audio unit processor that enables editing and modification of the second audio information in real time, a representation of the second audio unit processor being graphically displayed on the electronic display screen.

13. The system of claim 12, wherein the algorithm includes flattening the second audio information layer by permanently applying the second audio unit processor to the second audio information, and saving the flattened first audio information layer and the flattened second audio information layer as a digital file, the first and second audio information layers being distinguishable within the digital file using the audio file editor.

14. The system of claim 13, wherein the algorithm includes combining the first audio information layer and the second audio information layer to create a new single-layer electronic audio file.

15. The system of claim 11, further including associating, with the first audio information, a plurality of audio unit processors that enable editing and modification of the first audio information in real time using the user input device, a representation of each of the plurality of audio unit processors being graphically displayed on the electronic display screen.

16. The system of claim 11, wherein the first audio unit processor is selected from the group consisting of: alterations to audio volume or level, matching the maximum or RMS audio level to a value set by the user, inverting the audio phase, altering the beginning or endpoint of a segment of audio, changing the speed or pitch of audio, and converting the sampling rate of audio.

17. The system of claim 11, wherein the algorithm includes graphically displaying the first audio information on the electronic display screen as a waveform.

18. The system of claim 11, wherein the algorithm includes associating an audio unit processor globally with both the first and second audio information layers to enable editing and modification of the first audio information and second audio information simultaneously in real time.

\* \* \* \* \*

UNITED STATES PATENT AND TRADEMARK OFFICE
CERTIFICATE OF CORRECTION

PATENT NO. : 8,612,035 B2
APPLICATION NO. : 12/987608
DATED : December 17, 2013
INVENTOR(S) : Matthew J. Foust et al.

Page 1 of 1

It is certified that error appears in the above-identified patent and that said Letters Patent is hereby corrected as shown below:

In the Specification

Column 6, Line 11:
Delete "WEWaveformViewMenu.m.svn-base" and insert --WEWaveformView_Menu.m.svn-base--.

Column 11, Lines 35 and 36:
Delete "Macintosh®" and insert --MACINTOSH®--.

Column 14, Line 60:
Delete "...may also passed off to meters 164" and insert --may also be passed off to meters 164--.

Column 24, Line 52:
Delete "handle 1638" and insert --handle 638--.

Column 24, Line 67:
Delete "edit 1099" and insert --edit 109A--.

Signed and Sealed this
Twelfth Day of August, 2014

Michelle K. Lee
*Deputy Director of the United States Patent and Trademark Office*